(12) United States Patent
Minemura et al.

(10) Patent No.: US 11,768,111 B2
(45) Date of Patent: Sep. 26, 2023

(54) COLOR MEASUREMENT APPARATUS

(71) Applicant: Seiko Epson Corporation, Tokyo (JP)

(72) Inventors: Hidefumi Minemura, Shiojiri (JP); Sho Aruga, Chino (JP); Haruki Miyasaka, Matsumoto (JP); Kenichi Shirota, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 10 days.

(21) Appl. No.: 17/695,294

(22) Filed: Mar. 15, 2022

(65) Prior Publication Data

US 2022/0299371 A1 Sep. 22, 2022

(30) Foreign Application Priority Data

Mar. 18, 2021 (JP) ................. 2021-044555

(51) Int. Cl.
*G01J 3/51* (2006.01)
*G01J 3/02* (2006.01)

(52) U.S. Cl.
CPC ............... *G01J 3/51* (2013.01); *G01J 3/0264* (2013.01); *G01J 3/0272* (2013.01)

(58) Field of Classification Search
CPC .......... G01J 3/51; G01J 3/0264; G01J 3/0272; G01J 3/0202; G01J 3/0232; G01J 3/0283; G01J 3/0291; G01J 3/26; G01J 3/32; G01J 3/46; G02B 5/284
See application file for complete search history.

(56) References Cited

U.S. PATENT DOCUMENTS

| 2010/0328667 A1* | 12/2010 | Wegmuller | G01J 3/02 356/402 |
| 2017/0126933 A1* | 5/2017 | Kanai | H04N 1/00023 |
| 2019/0186997 A1* | 6/2019 | Nakai | G01J 3/50 |

FOREIGN PATENT DOCUMENTS

| JP | 2006-202446 | 8/2006 |
| WO | 2010-021266 | 2/2010 |

\* cited by examiner

*Primary Examiner* — Tarifur R Chowdhury
*Assistant Examiner* — Carlos Perez-Guzman
(74) *Attorney, Agent, or Firm* — WORKMAN NYDEGGER

(57) ABSTRACT

An apparatus internal unit disposed inside a casing includes a fixed unit coupled to an opening portion forming member, a movable unit that is a unit including an incident light processing portion and is configured to be displaced with respect to the fixed unit in a first direction along an optical axis, and at least one elastic member that holds a position of the movable unit in the first direction with respect to the fixed unit by elasticity.

8 Claims, 32 Drawing Sheets

FIG. 18
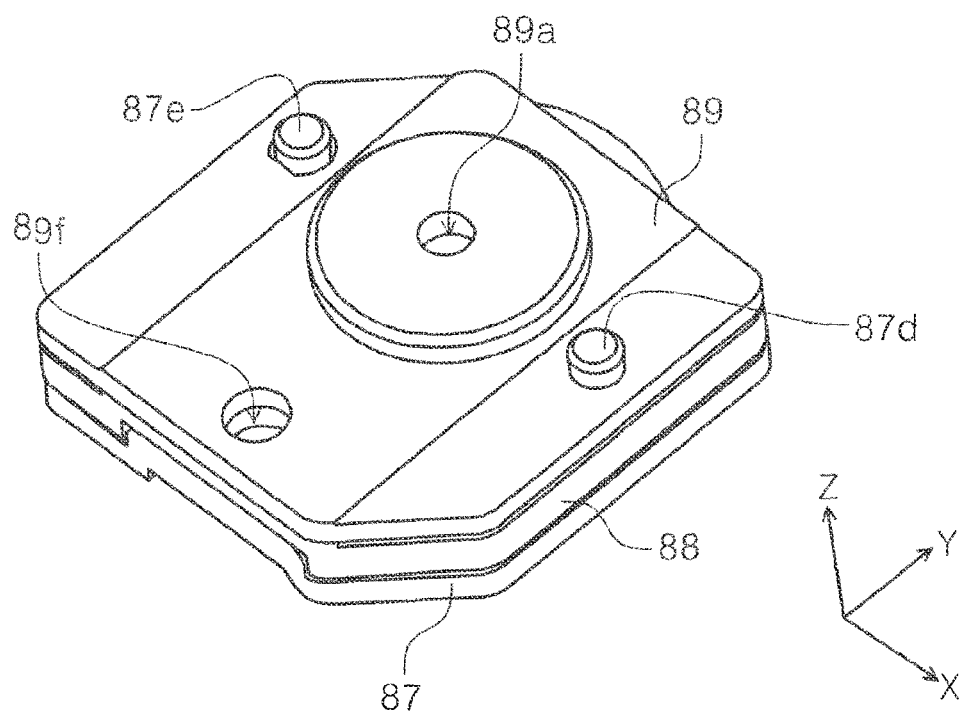
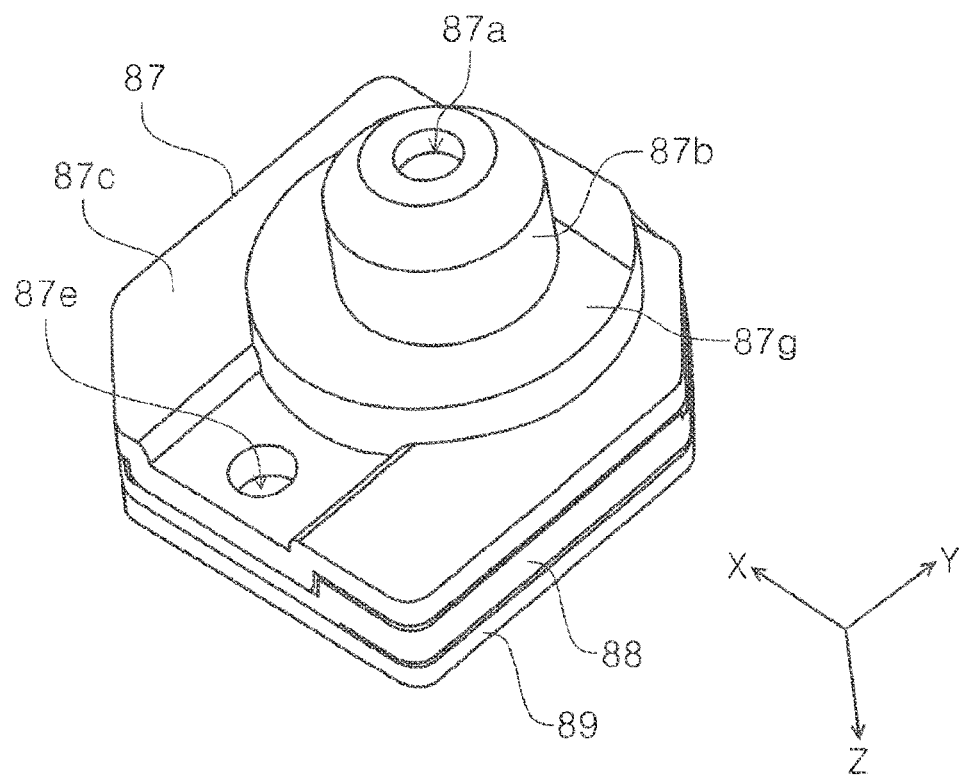

COLOR MEASUREMENT APPARATUS

The present application is based on, and claims priority from JP Application Serial Number 2021-044555, filed Mar. 18, 2021, the disclosure of which is hereby incorporated by reference herein in its entirety.

BACKGROUND

1. Technical Field

The present disclosure relates to a color measurement apparatus that performs color measurement based on light arriving from a measurement target.

2. Related Art

In an electronic apparatus, an impact attenuation structure as disclosed in JP-A-2006-202446 may be employed such that an apparatus main body inside a casing does not receive a significant impact even when the apparatus receives a significant impact by an event such as a fall. In the impact attenuation structure disclosed in JP-A-2006-202446, an elastic member of which an initial state is a compressed state from a free length is disposed between the casing and the apparatus main body. When the apparatus receives an impact by an event such as a fall, the elastic member is configured to suppress the impact received by the apparatus main body inside the casing by elastically deforming.

In the technology of the related art, the elastic member is configured to be disposed on total six surfaces of an upper surface and a lower surface of the apparatus main body disposed inside the casing and side surfaces around the apparatus main body. Thus, it is difficult to decide a position of the apparatus main body with respect to the casing.

Here, in a color measurement apparatus in which an opening portion is formed on a bottom surface of a casing and that performs measurement using a measurement section inside the apparatus by causing light arriving from a measurement target to enter inside the apparatus through the opening portion, there is a concern that appropriate measurement cannot be performed when positions of the opening portion and the apparatus main body shift irregularly.

SUMMARY

According to an aspect of the present disclosure, there is provided a color measurement apparatus including an opening portion to allow light arriving from a measurement target to enter inside the apparatus, an incident light processing portion that processes light incident inside the apparatus through the opening portion, an opening portion forming member that is arranged on a bottom surface side of the apparatus and in which the opening portion is formed, and an apparatus internal unit including the incident light processing portion, in which the apparatus internal unit includes a fixed unit coupled to the opening portion forming member, a movable unit that is a unit including the incident light processing portion and is configured to be displaced with respect to the fixed unit in a first direction along an optical axis of light heading toward the incident light processing portion from the opening portion, and at least one elastic member that holds a position of the movable unit in the first direction with respect to the fixed unit by elasticity.

BRIEF DESCRIPTION OF THE DRAWINGS

FIG. 18 is a perspective view of a state where a light condensing member, an intermediate member, and a reduction portion forming member are assembled.

DESCRIPTION OF EXEMPLARY EMBODIMENTS

Figure 1:
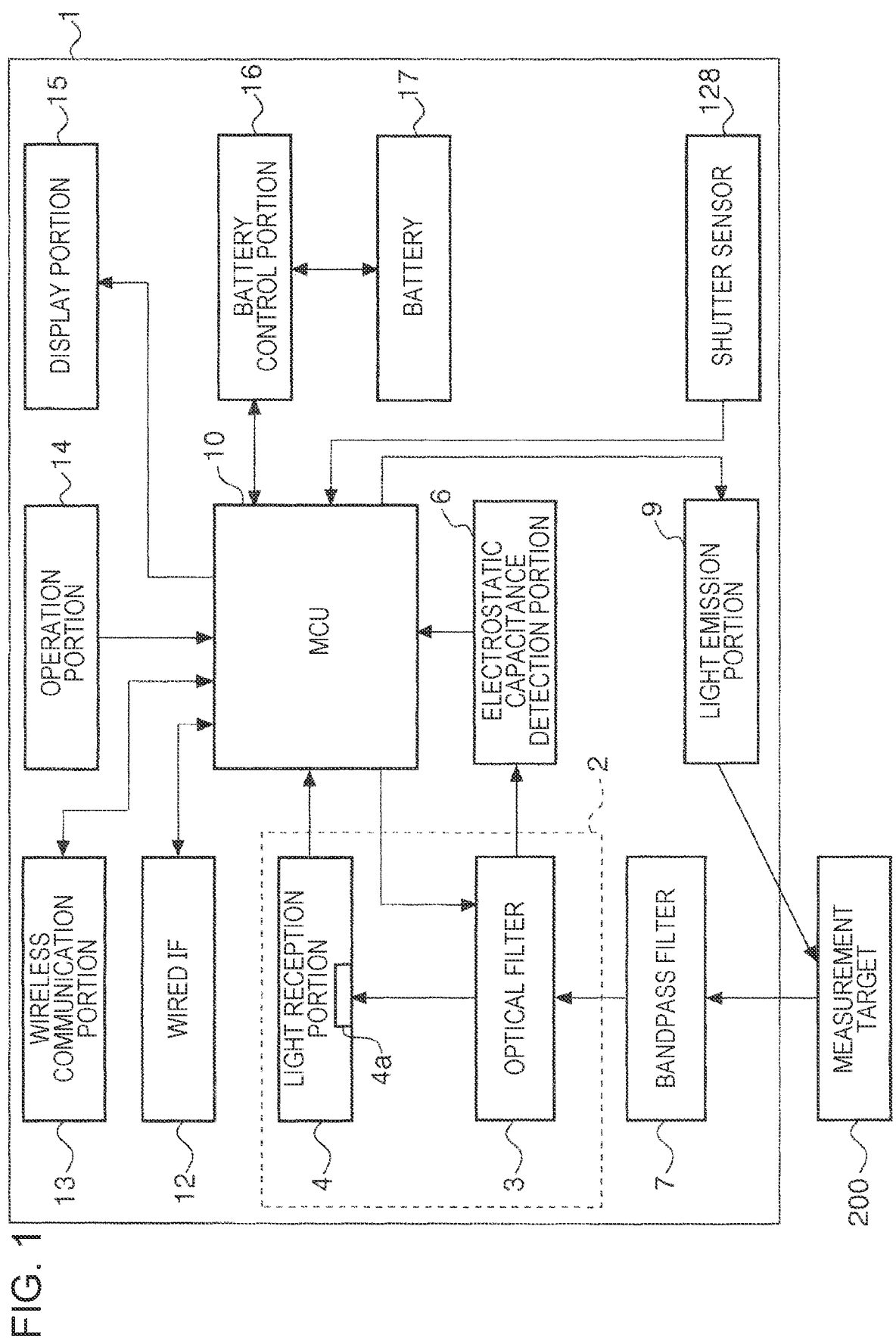
FIG. 1 is a block diagram illustrating functions of a color measurement apparatus.

Hereinafter, the present disclosure will be schematically described.

A color measurement apparatus according to a first aspect includes an opening portion to allow light arriving from a measurement target to enter inside the apparatus, an incident light processing portion that processes light incident inside the apparatus through the opening portion, an opening portion forming member that is arranged on a bottom surface side of the apparatus and in which the opening portion is formed, and an apparatus internal unit including the incident light processing portion, in which the apparatus internal unit includes a fixed unit coupled to the opening portion forming member, a movable unit that is a unit including the incident light processing portion and is configured to be displaced with respect to the fixed unit in a first direction along an optical axis of light heading toward the incident light processing portion from the opening portion, and at least one elastic member that holds a position of the movable unit in the first direction with respect to the fixed unit by elasticity.

According to the present aspect, the apparatus internal unit includes the fixed unit and the movable unit that is the unit including the incident light processing portion and is configured to be displaced with respect to the fixed unit in a first direction along an optical axis of light heading toward the incident light processing portion from the opening portion. The elastic member is configured to attenuate an impact on the movable unit in the first direction. Accordingly, a shift in position between the opening portion and the incident light processing portion in a direction intersecting with the first direction is unlikely to occur, and an appropriate color measurement result can be obtained while an impact attenuation structure for attenuating an impact applied to the incident light processing portion is employed.

In addition, since the impact attenuation structure in the first direction is employed, an increase in size and cost of the apparatus can be suppressed, compared to a configuration in which the impact attenuation structure is also disposed in a direction of high endurance against impact.

Furthermore, the entire weight of the apparatus internal unit is not applied to the impact attenuation structure, and only a weight of the movable unit is applied to the elastic member, that is, the impact attenuation structure. Thus, an increase in size and cost of the impact attenuation structure can also be suppressed, and an increase in size and cost of the apparatus can also be suppressed.

A second aspect is the color measurement apparatus according to the first aspect, in which the fixed unit includes a first unit coupled to the opening portion forming member, a second unit that is positioned on a side away from the opening portion forming member with respect to the first unit in the first direction and is coupled to the first unit in a state of having an interval with the first unit in the first direction, and a guide shaft disposed to extend in the first direction in the interval between the first unit and the second unit, and the movable unit includes a guided portion that is interposed between the first unit and the second unit and is guided by the guide shaft.

According to the present aspect, an apparatus in which the movable unit is configured to be displaced in the first direction can be obtained with a simple structure at a low cost.

A third aspect is the color measurement apparatus according to the second aspect, in which the elastic member is disposed between the first unit and the guided portion and between the second unit and the guided portion in a state where a free length in the first direction is reduced.

According to the present aspect, the elastic member is disposed between the first unit and the guided portion and between the second unit and the guided portion in a state where the free length in the first direction is reduced. Thus, the elastic member is in a compressed state at all times. Accordingly, the position of the movable unit in the first direction is stable, and an installation position of the elastic member is unlikely to shift in the direction intersecting with the first direction.

A fourth aspect is the color measurement apparatus according to the third aspect, in which a centroid position of the elastic member when viewed from the first direction is a position corresponding to a centroid position of the movable unit.

According to the present aspect, the centroid position of the elastic member when viewed from the first direction is the position corresponding to the centroid position of the movable unit. Thus, when the movable unit is displaced in the first direction against the elasticity of the elastic member, a force in the direction intersecting with the first direction is unlikely to occur on the movable unit. Accordingly, the movable unit can be smoothly displaced in the first direction.

A fifth aspect is the color measurement apparatus according to any one of the first to fourth aspects, in which a battery that is a power supply source of the apparatus is disposed in the fixed unit.

According to the present aspect, the battery that is the power supply source of the apparatus is disposed in the fixed unit instead of the movable unit. Thus, a weight of the battery that is a heavy object is not applied to the elastic member, that is, the impact attenuation structure. Accordingly, an increase in size or cost of the elastic member can be suppressed, and an increase in size and cost of the apparatus can also be suppressed.

A sixth aspect is the color measurement apparatus according to any one of the first to fifth aspects, in which the incident light processing portion includes a variable wavelength optical filter that transmits a predetermined wavelength component of incident light, and a light reception portion that receives light transmitted through the optical filter, the movable unit includes a first circuit substrate including the optical filter, and a frame that is disposed at a position facing the optical filter disposed in the first circuit substrate and includes a reduction portion which reduces a quantity of light heading toward the optical filter through the opening portion, and a gap between the frame and the optical filter is filled with a plastic member.

The optical filter is a precision part, and an external force when exerted on the optical filter in the first direction adversely affects a color measurement result. Thus, it is necessary to form a gap between both of the frame and the optical filter such that the frame does not come into contact with the optical filter. However, when an impact due to a fall or the like is received, there is a concern that a member constituting the optical filter is peeled off in the first direction. From such a viewpoint, it is considered that a gap is formed between the frame and the optical filter, and an elastic material or the like is interposed in the gap. However, the elastic material applies an external force to the optical filter at all times and thus, is not preferred.

From such a viewpoint, the gap between the frame and the optical filter is filled with the plastic member in the present aspect. Accordingly, normally an external force is unlikely to be applied to the optical filter. When an impact is exerted, the optical filter can be supported by the plastic member, and peeling of the member constituting the optical filter can be suppressed.

A seventh aspect is the color measurement apparatus according to the sixth aspect, in which the optical filter is a Fabry-Perot etalon.

According to the present aspect, an effect of the sixth aspect is obtained in a configuration in which the optical filter is the Fabry-Perot etalon.

An eighth aspect is the color measurement apparatus according to any one of the first to fourth aspects, in which the movable unit includes a first circuit substrate including the incident light processing portion, a second circuit substrate including a light emission portion that emits light for measurement, and a third circuit substrate to which a battery that is a power supply source of the apparatus is coupled, the fixed unit includes a fourth circuit substrate that is positioned on an upper surface of the apparatus and to which a display portion which performs various types of display is coupled, and the second circuit substrate, the first circuit substrate, the third circuit substrate, the battery, and the fourth circuit substrate are arranged in an overlapping manner in order from the opening portion forming member toward the display portion in the first direction.

According to the present aspect, in order from the opening portion forming member toward the display portion in the first direction, the second circuit substrate, the first circuit substrate, the third circuit substrate, the battery, and the fourth circuit substrate are arranged in an overlapping manner. Thus, an apparatus dimension in the direction intersecting with the first direction can be suppressed.

Hereinafter, the present disclosure will be specifically described.

An X-Y-Z coordinate system illustrated in each drawing is an orthogonal coordinate system. An X-Y plane is a horizontal plane, and a Y-Z plane is a vertical plane.

In addition, a Z axis direction is a vertical direction and is one example of a first direction that intersects with an upper surface 50e and a bottom surface 50f of a color measurement apparatus 1. The first direction is a direction parallel to an optical axis CL described later.

In addition, a Y axis direction is a direction orthogonal to the first direction and is a longitudinal direction of the apparatus when the color measurement apparatus 1 is viewed from the Z axis direction. In addition, an X axis direction is a direction orthogonal to the Y axis direction and is a short direction of the apparatus when the color measurement apparatus 1 is viewed from the Z axis direction.

In description of a configuration of the color measurement apparatus 1 in the present specification, the bottom surface 50f is mounted on a mounting surface parallel to the horizontal plane, and the longitudinal direction of the color measurement apparatus 1 is in the Y axis direction.

Overall Configuration of Color Measurement Apparatus 1

Figure 2:
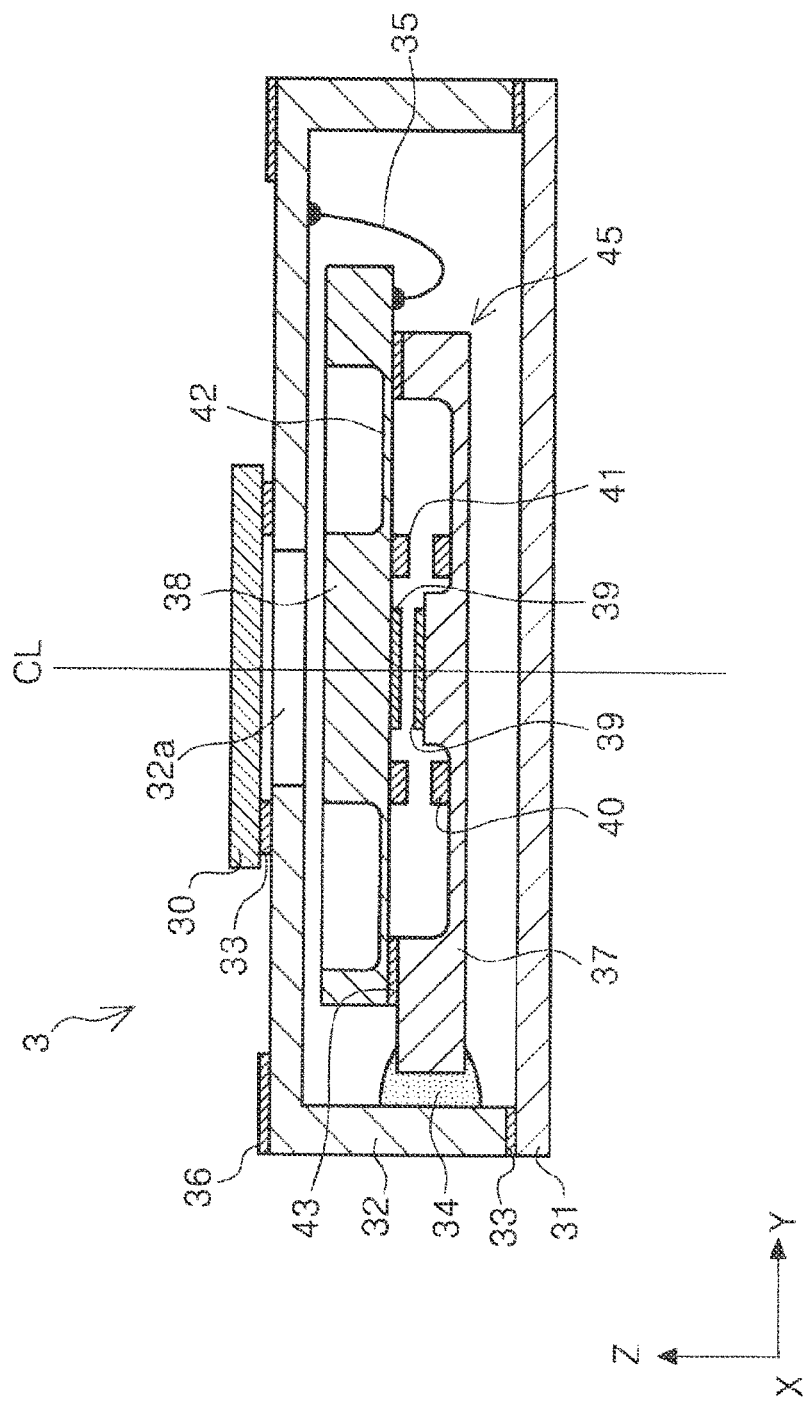
FIG. 2 is a cross-sectional view of an optical filter.

First, an overall configuration of the color measurement apparatus 1 according to the present embodiment will be mainly described from a functional viewpoint with reference to FIG. 1 and FIG. 2.

The color measurement apparatus 1 has a configuration for performing color measurement based on light arriving from a measurement target 200. Examples of light arriving from the measurement target 200 include light reflected by the measurement target 200 and light emitted by the measurement target 200 itself.

The color measurement apparatus 1 includes a bandpass filter 7, an optical filter 3, a light reception portion 4, an electrostatic capacitance detection portion 6, a light emission portion 9, a micro controller unit (MCU) 10, a wired interface (IF) 12, a wireless communication portion 13, an operation portion 14, a display portion 15, a battery control portion 16, and a battery 17.

The optical filter 3 and the light reception portion 4 constitute an incident light processing portion 2 that processes incident light arriving from the measurement target 200.

The bandpass filter 7 transmits light of a visible light range, for example, 380 nm to 720 nm, and cuts light of an ultraviolet light range and an infrared light range out of the incident light arriving from the measurement target 200. Accordingly, light of the visible light range is incident on the optical filter 3. Light arriving the bandpass filter 7 from the measurement target 200 is caused to enter inside the apparatus from an opening portion 21a (refer to FIG. 5), described later, and reaches the bandpass filter 7 through a measurement window portion 87a (refer to FIG. 5).

The optical filter 3 selectively transmits any wavelength component from visible light passing through the bandpass filter 7. Light transmitted through the optical filter 3 is incident on a photo diode 4a that is one example of a light reception element, and is processed by the light reception portion 4 including the photo diode 4a. The light reception portion 4 converts an intensity of received light into a voltage value, further converts the voltage value into a digital signal, and outputs the digital signal to the MCU 10. The color measurement apparatus 1 can measure a spectrum of the measurement target 200 by repeating wavelength selection performed by the optical filter 3 and acquisition of a light reception intensity using the light reception portion 4.

Here, a configuration of the optical filter 3 will be described with reference to FIG. 2. The optical filter 3 in the present embodiment is a variable wavelength Fabry-Perot etalon that transmits a predetermined wavelength component of the incident light arriving from the measurement target 200, and is a wavelength filter that uses multiple interference between two reflection surfaces facing each other.

In FIG. 2, the optical filter 3 includes a variable wavelength interference filter 45. The variable wavelength interference filter 45 is incorporated inside an exterior body that is configured with a first glass member 30, a second glass member 31, and a case 32.

The case 32 and the first glass member 30, and the case 32 and the second glass member 31 are joined to each other by a joining member 33 such as low melting point glass or epoxy resin. In addition, the variable wavelength interference filter 45 and the case 32 are fixed by a fixing material 34 such as an adhesive. An electrode 36 on an outer surface of the case 32 and the variable wavelength interference filter 45 are conducted by wire bonding 35 and wiring inside the case 32.

The variable wavelength interference filter 45 includes a base substrate 37 and a diaphragm substrate 38. The base substrate 37 and the diaphragm substrate 38 are joined by a joining film 43. A mirror 39 is deposited on each of the base substrate 37 and the diaphragm substrate 38. The outermost surfaces of the mirrors 39 facing each other are formed of a conductor. An electrostatic capacitance between the mirrors 39 facing each other is detected by the electrostatic capacitance detection portion 6 (refer to FIG. 1). The electrostatic capacitance detection portion 6 is configured with a capacitance to voltage (CV) converter and converts the detected electrostatic capacitance into a voltage value, further converts the voltage value into a digital value, and transmits the digital value to the MCU 10.

A distance between the mirrors 39 facing each other is controlled by an electrostatic actuator that is configured by causing a fixed electrode 40 and a movable electrode 41 that are concentrically formed in a view from the Z axis direction to face each other.

When a voltage is applied between the fixed electrode 40 and the movable electrode 41 facing each other, a force that attracts the fixed electrode 40 and the movable electrode 41 to each other is generated by an electrostatic force. At this point, a diaphragm portion 42 that is concentrically formed is deformed. This attracts the mirror 39 of the diaphragm substrate 38 to a base substrate 37 side, and the distance between the mirrors 39 facing each other is controlled. A wavelength of light transmitted through the variable wavelength interference filter 45 is selected in accordance with the distance between the mirrors 39 facing each other.

At a time of spectroscopic measurement, light from the measurement target 200 is incident on the optical filter 3 from a second glass member 31 side to a first glass member 30 side along the optical axis CL. The optical axis CL is a line that is parallel to the Z axis direction and passes through centers of the opening portion 21a (refer to FIG. 5), the measurement window portion 87a (refer to FIG. 5), the variable wavelength interference filter 45, and the photo diode 4a. Particularly, the opening portion 21a, the measurement window portion 87a, and the variable wavelength interference filter 45 have a perfect circular shape in a view from the Z axis direction, and the optical axis CL passes through the centers thereof. Hereinafter, the optical axis CL may be referred to as a center position CL.

Light incident on the optical filter 3 interferes between the mirrors 39 facing each other, and light of a wavelength selected in accordance with the distance between the mirrors 39 facing each other is transmitted through the variable wavelength interference filter 45. Light transmitted through the variable wavelength interference filter 45 is transmitted through the first glass member 30 through an opening portion 32a of the case 32 and heads toward the light reception portion 4. The opening portion 32a of the case 32 is an opening portion having a perfect circular shape centered at the optical axis CL.

The above is the configuration of the optical filter 3. As described above, the optical filter 3 has a configuration in which the wavelength of transmitted light is selected in accordance with the distance between the mirrors 39 facing each other in the variable wavelength interference filter 45. Thus, the optical filter 3 is vulnerable to impact in the Z axis direction. That is, measurement accuracy is likely to be decreased due to the impact in the Z axis direction. Meanwhile, the optical filter 3 is said to have a configuration that is relatively strong against impact in a direction intersecting with the Z axis direction.

Returning to FIG. 1, the MCU 10 is a control apparatus based on a microprocessor and incorporates a memory storing various programs and various data necessary for controlling the color measurement apparatus 1.

The MCU 10 transmits control information necessary for driving the electrostatic actuator, which is configured by causing the fixed electrode 40 and the movable electrode 41 to face each other as described with reference to FIG. 2, to an amplifier, not illustrated, and supplies a predetermined drive voltage to the optical filter 3 from the amplifier. The MCU 10 compares information related to the voltage value output from the electrostatic capacitance detection portion 6 with a stored value and performs a feedback control of the optical filter 3 based on the comparison.

The light emission portion 9 emits light for measurement toward the measurement target 200. The light emission portion 9 is configured with a plurality of light emission elements, specifically, a plurality of LEDs, having different wavelength distributions for light emission. The MCU 10 controls turn-on and turn-off of the light emission portion 9.

The wired IF 12 and the wireless communication portion 13 are constituents for communicating with an external apparatus. For example, Universal Serial Bus (USB) can be employed as a standard for communication through the wired IF 12. In addition, for example, Bluetooth can be employed as a standard of the wireless communication portion 13. USB and Bluetooth are registered trademarks. The MCU 10 transmits various data to the external apparatus and receives various data from the external apparatus through the wired IF 12 or the wireless communication portion 13. In addition, the color measurement apparatus 1 can charge the battery 17 by receiving a supply of power from the external apparatus through the wired IF 12.

The operation portion 14 is configured with a power button and various operation setting buttons and transmits a signal corresponding to an operation to the MCU 10. The operation portion 14 will be described in further detail later.

The display portion 15 is configured with, for example, a liquid crystal panel and displays various information such as a user interface for setting a color measurement condition based on a signal transmitted from the MCU 10, and a color measurement result.

A shutter sensor 114 that transmits a detection signal to the MCU 10 is a sensor for detecting a position of a shutter unit 110 described later.

The battery 17 is a lithium ion secondary battery in the present embodiment and supplies power to each constituent needing power in the color measurement apparatus 1. The constituents receiving the supply of power from the battery 17 include an incident light processing portion 2 described later. The battery control portion 16 performs various controls such as a charging control of the battery 17.

Exterior Configuration of Color Measurement Apparatus 1

Next, an exterior configuration of the color measurement apparatus 1 will be described with reference to FIG. 3, FIG. 4, FIG. 5, and FIG. 6.

An apparatus main body 50 of the color measurement apparatus 1 is configured to have an outline has a box shape as a whole by a main casing 51, an upper casing 52, a bottom first casing 53A, and a bottom second casing 53B. An apparatus internal unit 1a is disposed inside an outer shell formed by these casings. The upper casing 52, the bottom first casing 53A, and the bottom second casing 53B are formed of a resin material in the present embodiment. The main casing 51 is formed of aluminum. The main casing 51 can also be formed of other metals or a resin material instead of aluminum. In addition, the upper casing 52, the bottom first casing 53A, and the bottom second casing 53B can be formed of aluminum or other metals instead of a resin material.

In each drawing, reference sign 50a denotes a side surface of the apparatus main body 50 in a +Y direction. Hereinafter, the side surface will be referred to as a front surface 50a. In addition, reference sign 50b denotes a side surface of the apparatus main body 50 in a +X direction. Hereinafter, the side surface will be referred to as a right surface 50b. In addition, reference sign 50c denotes a side surface of the apparatus main body 50 in a −X direction. Hereinafter, the side surface will be referred to as a left surface 50c. In addition, reference sign 50d denotes a side surface of the apparatus main body 50 in a −Y direction. Hereinafter, the side surface will be referred to as a rear surface 50*d*.

In the present specification, each term of "up", "down", "left", and "right" is used based on a direction of view from a user when the user of the color measurement apparatus 1 uses the color measurement apparatus 1 by holding the color measurement apparatus 1 in a state where the rear surface 50*d* faces the user.

In FIG. 3 to FIG. 6, the front surface 50*a* is formed by a front wall portion 51*a* of the main casing 51. The right surface 50*b* is formed by a right wall portion 51*b* of the main casing 51. The left surface 50*c* is formed by a left wall portion 51*c* of the main casing 51. The rear surface 50*d* is formed by a rear wall portion 51*d* of the main casing 51.

In addition, reference sign 50*e* denotes a surface of the apparatus main body 50 in a +Z direction. Hereinafter, the surface will be referred to as the upper surface 50*e*. In addition, reference sign 50*f* denotes a surface of the apparatus main body 50 in a −Z direction. Hereinafter, the surface will be referred to as the bottom surface 50*f*.

The operation portion 14 and the display portion 15 are arranged on the upper surface 50*e* of the apparatus main body 50 in the Y axis direction.

The operation portion 14 is configured to include a power button 55, a decision button 54, a return button 56, and a cross button 60. The cross button 60 is configured with an up button 61, a down button 62, a left button 63, and a right button 64. In the color measurement apparatus 1 according to the present embodiment, all operation buttons are arranged on the upper surface 50*e* and are integrated in the operation portion 14.

The power button 55 is a button for powering the color measurement apparatus 1 ON and OFF. In addition, the decision button 54 is a button for deciding various settings displayed on the display portion 15, that is, a button for deciding a color measurement condition, and is also a button for executing color measurement. The decision button 54 has a perfect circular shape in a view from the Z axis direction.

A light emission portion 59 having a ring shape constitutes a periphery of the decision button 54. A light emission color and a light emission state change in accordance with a state of the apparatus.

The return button 56 is a button for returning to an immediately previous state in the user interface displayed on the display portion 15 and is also a button for canceling execution of an operation.

The cross button 60 is a button for selecting various items in the user interface displayed on the display portion 15.

Various information such as the color measurement result is displayed on the display portion 15. The display portion 15 is configured with a liquid crystal display 67 in the present embodiment (refer to FIG. 9 as well). Hereinafter, the liquid crystal display 67 will be abbreviated to the LCD 67. A display portion cover 57 that is a transparent member is disposed in an upper portion of the LCD 67, and a part of the upper surface 50*e* is formed by the display portion cover 57.

Figure 9:
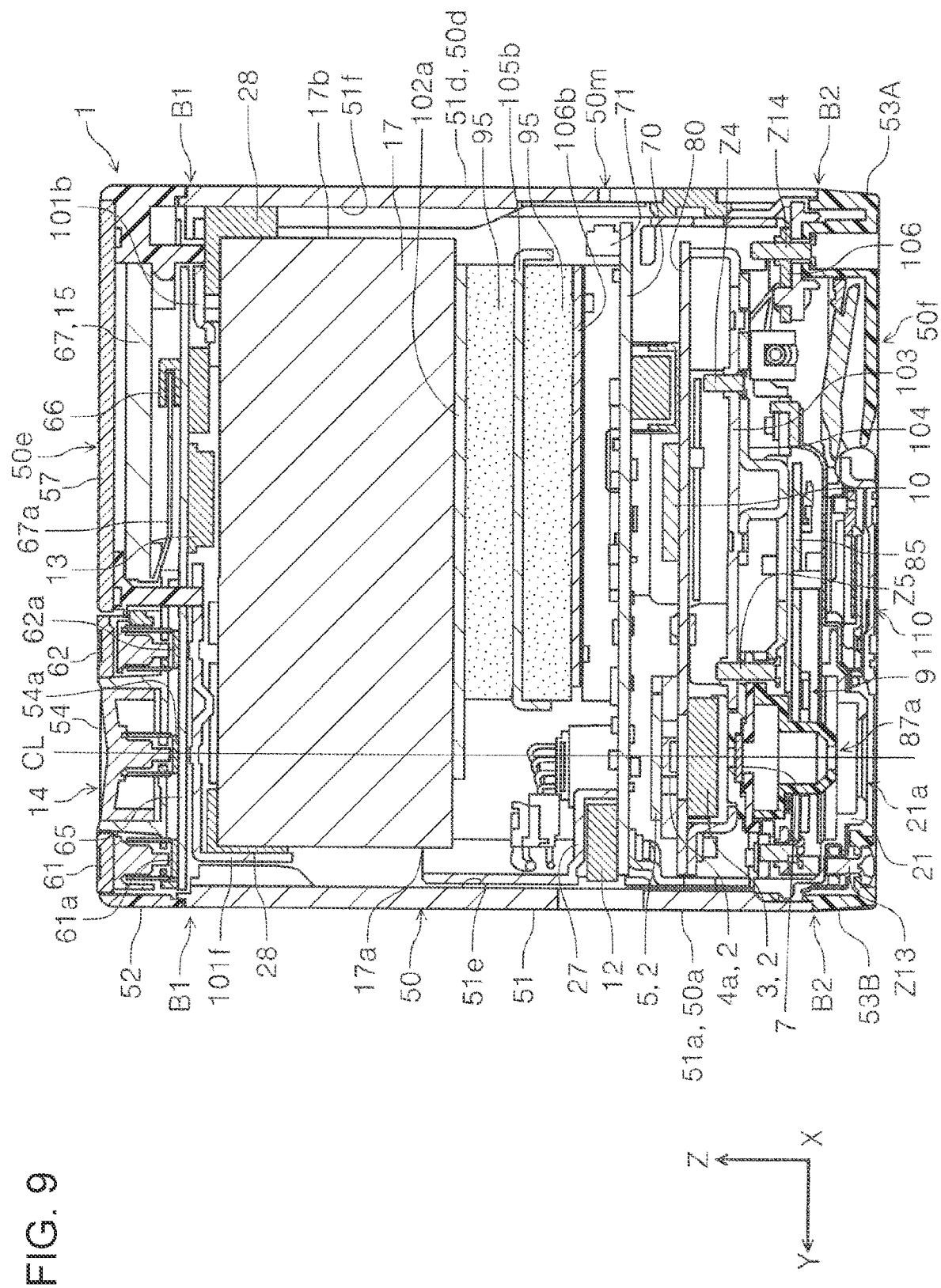
FIG. 9 is IX-IX cross-sectional view of FIG. 6.

In the present embodiment, it is configured that a step almost does not occur between an upper surface of the display portion cover 57 and an upper surface of the operation portion 14 as illustrated in FIG. 9. Accordingly, the upper surface 50*e* is configured as a planar surface that almost does not have a step as a whole. However, an upper surface of the decision button 54 is slightly recessed and is formed into a shape that fits a pulp of a finger of the user pushing the decision button 54.

Figure 4:
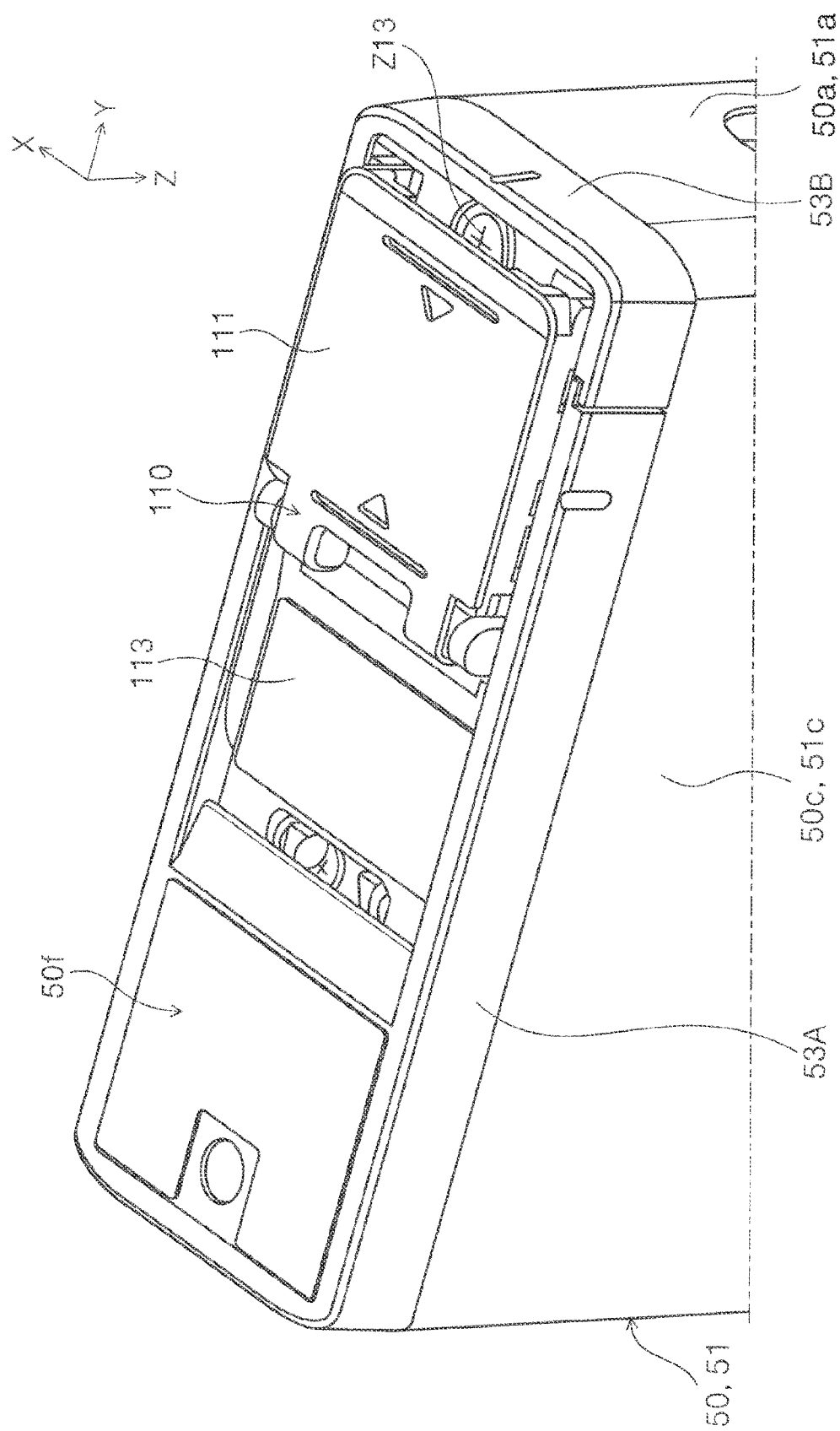
FIG. 4 is a perspective view illustrating a bottom portion of the color measurement apparatus in which a shutter unit is in a closed state.
Figure 5:
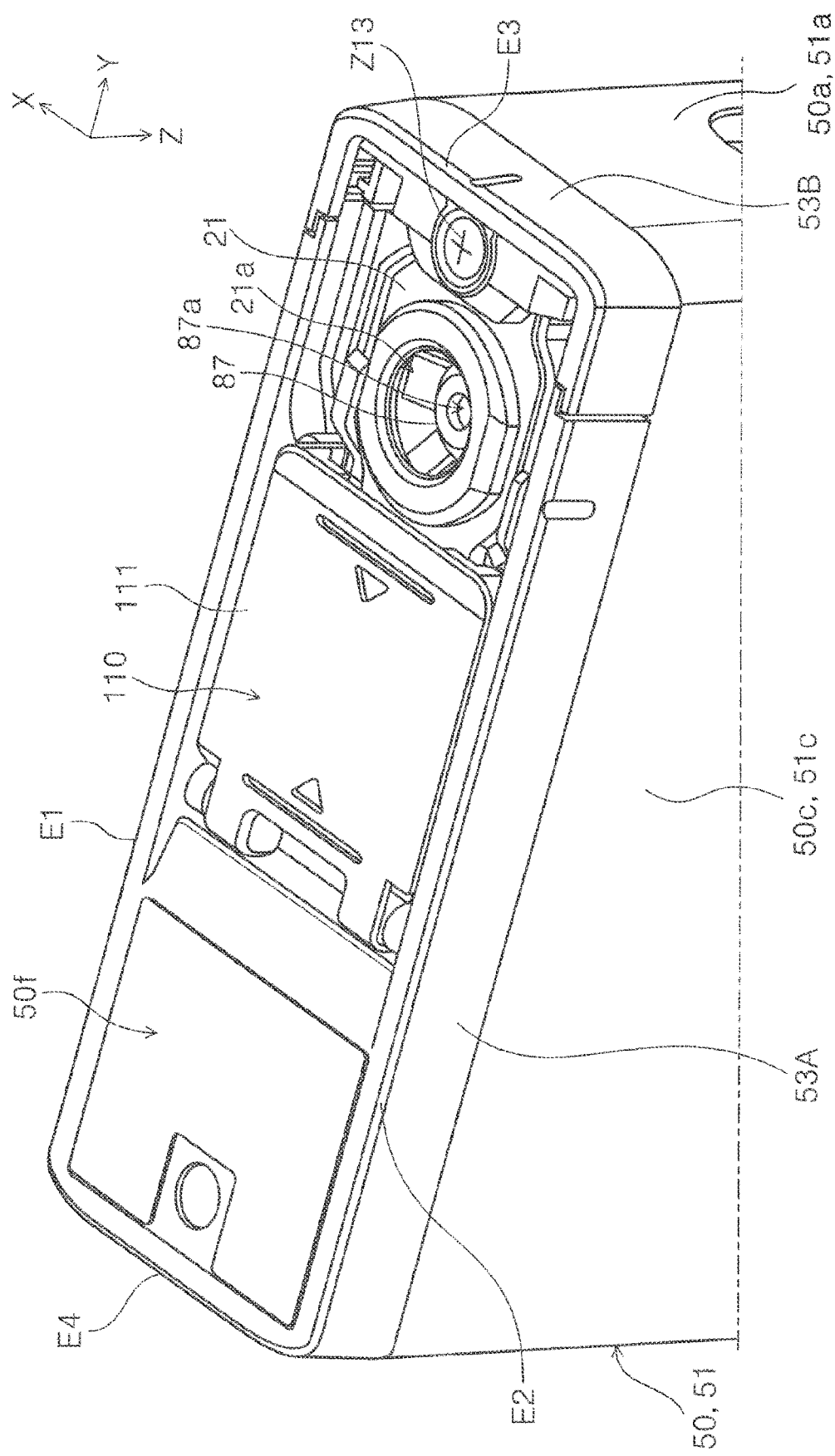
FIG. 5 is a perspective view illustrating the bottom portion of the color measurement apparatus in which the shutter unit is in an open state.

The shutter unit 110 is disposed on the bottom surface 50*f* as illustrated in FIG. 4 and FIG. 5. FIG. 4 illustrates a state where the shutter unit 110 is at a closed position, and FIG. 5 illustrates a state where the shutter unit 110 is at an open position. The shutter unit 110 can be displaced between the closed position and the open position by sliding the shutter unit 110 in the Y axis direction. In addition, the shutter unit 110 is disposed to be holdable at the closed position and the open position by a spring force of a spring not illustrated.

The shutter unit 110 is configured to include a shutter holding member 111 and a link member 113.

Opening the shutter unit 110 from the state in FIG. 4 exposes the opening portion 21*a* and the measurement window portion 87*a* as illustrated in FIG. 5. The opening portion 21*a* and the measurement window portion 87*a* are open in the −Z direction. The opening portion 21*a* and the measurement window portion 87*a* are opening portions having a perfect circular shape in a plan view. Here, being open means that light enters, and for example, means that a transparent glass plate may be disposed.

The opening portion 21*a* is formed in an opening portion forming member 21 disposed in a bottom portion of the apparatus, and the measurement window portion 87*a* is formed in a light condensing member 87 that is positioned in the +Z direction with respect to the opening portion forming member 21. The opening portion forming member 21 has a shape that extends across the entire bottom portion of the apparatus.

Figure 10:
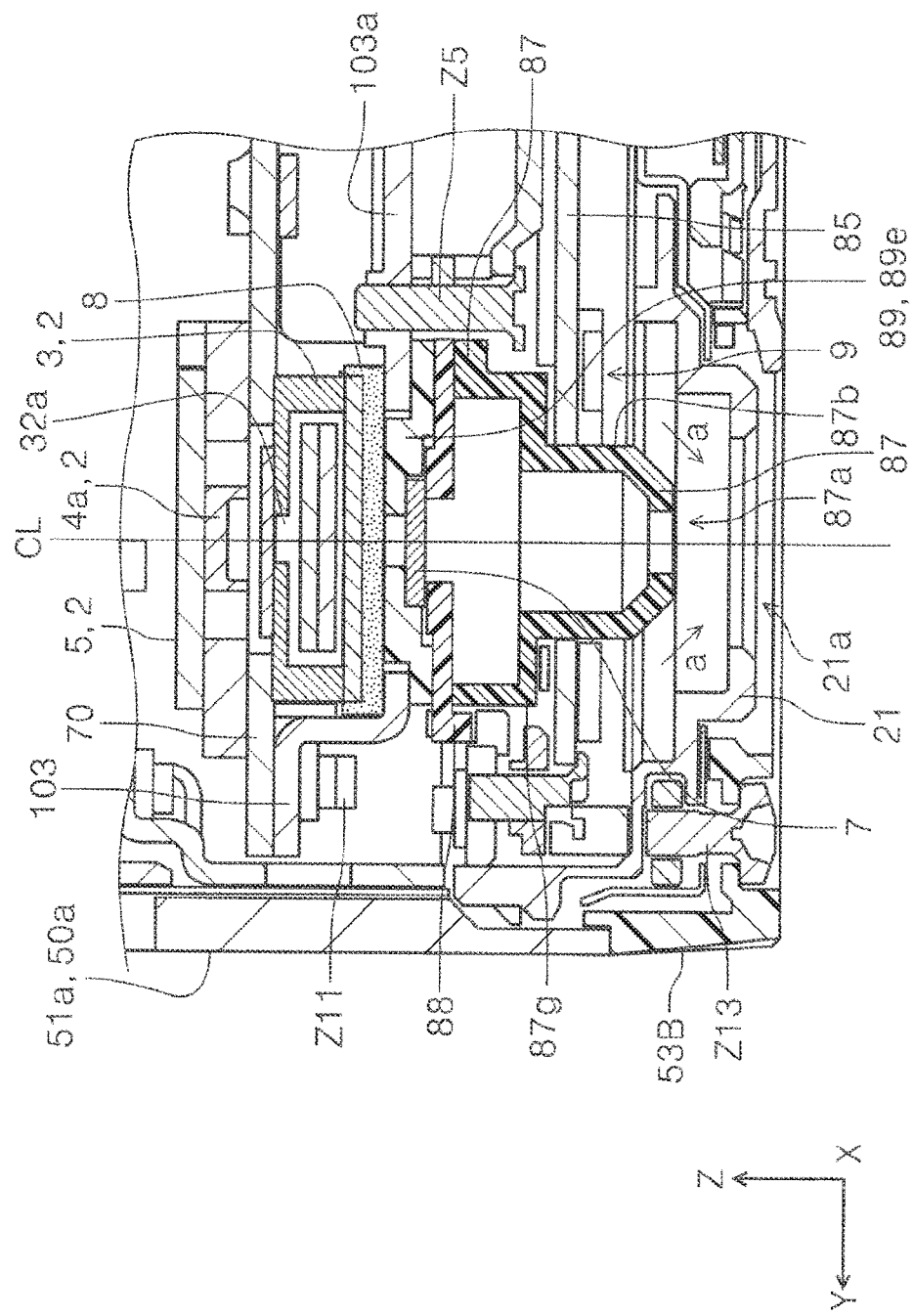
FIG. 10 is a partial enlarged view of FIG. 9.

Measurement light emitted from the light emission portion 9 passes between a cylindrical portion 87*b* of the light condensing member 87 and the opening portion forming member 21 as illustrated by arrow a inside the opening portion 21*a* in FIG. 10, and is radiated toward the measurement target 200 from the opening portion 21*a*. Light arriving from the measurement target 200 enters inside the apparatus from the opening portion 21*a*, further passes through the measurement window portion 87*a*, and is incident on the bandpass filter 7. The light condensing member 87 is one example of a cylindrical member that forms a passage of light heading toward a reduction portion 89*a*, described later, from the measurement target 200.

Figure 6:
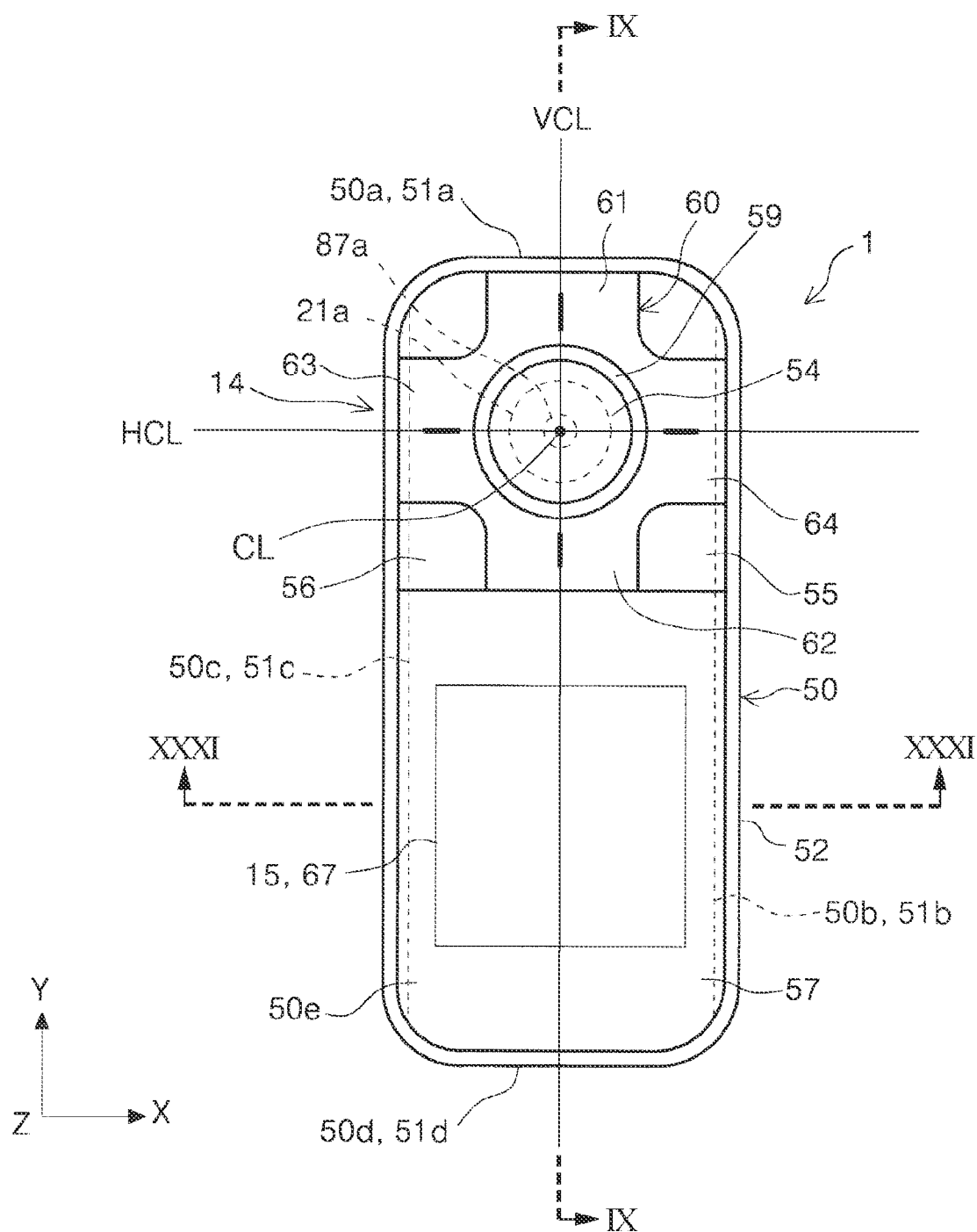
FIG. 6 is a plan view of an upper surface of the color measurement apparatus.

As illustrated in FIG. 6, the optical axis CL coincides with center axes of the opening portion 21*a* and the measurement window portion 87*a*. In FIG. 6, a straight line VCL is a straight line parallel to the Y axis direction and is a straight line passing through the optical axis CL in a view from the Z axis direction. In addition, a straight line HCL is a straight line parallel to the X axis direction and is a straight line passing through the optical axis CL in a view from the Z axis direction.

In the present embodiment, the optical axis CL coincides with a center position of the decision button 54 in the X-Y plane and also coincides with a center position of the cross button 60.

The power button 55 and the return button 56 are symmetrically arranged about the straight line VCL.

Figure 3:
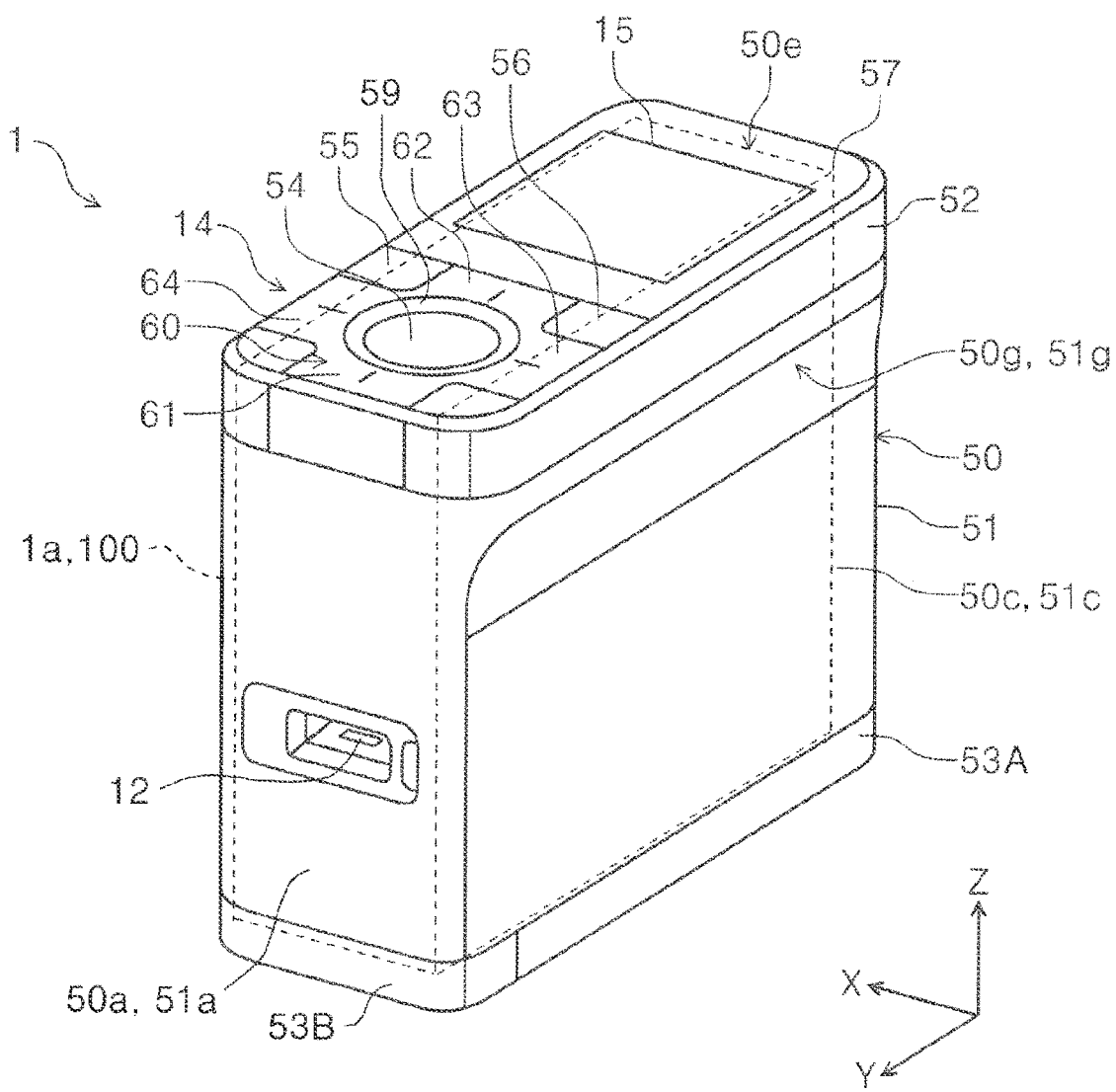
FIG. 3 is a perspective view of the color measurement apparatus viewed from above.

Next, as illustrated in FIG. 3, the wired IF 12 is disposed on the front surface 50*a* of the apparatus main body 50. By disposing the wired IF 12 on the front surface 50*a*, even when the color measurement apparatus 1 is used with a cable coupled to the wired IF 12, the cable is not present on the user side and is unlikely to hinder operation.

In addition, as illustrated in FIG. 9, an opening 50*m* is formed on the rear surface 50*d* of the apparatus main body 50, and a reset switch 71 is disposed behind the opening 50*m*. The reset switch 71 is a switch for returning various settings of the color measurement apparatus 1 to an initial state.

Figure 31:
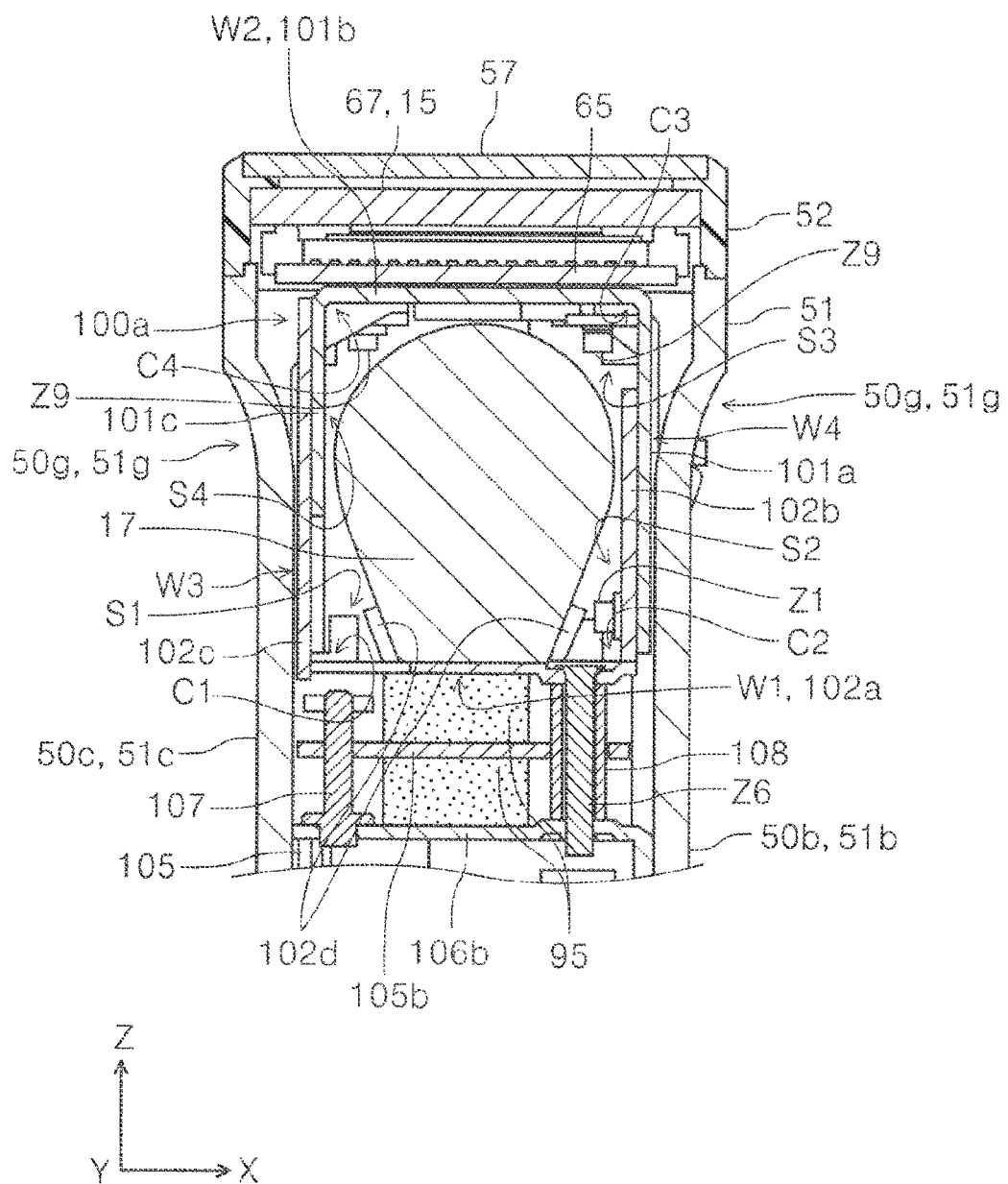
FIG. 31 is XXXI-XXXI cross-sectional view of FIG. 6.

As illustrated in FIG. 3 and FIG. 31, grip portions 50*g* are formed on the right surface 50*b* and the left surface 50*c* of the apparatus main body 50. The grip portions 50*g* are configured with recessed portions 51*g* formed in each of the right wall portion 51*b* and the left wall portion 51*c* of the main casing 51. The recessed portions 51*g* are formed by curved surfaces that face toward a center, in the X axis direction, of the apparatus main body 50 in the −Z direction.

By disposing the grip portions 50*g*, the user can easily and securely grip the apparatus main body 50.

Next, in FIG. 5, side edges forming a periphery of the bottom surface of the apparatus are formed by the bottom first casing 53A and the bottom second casing 53B. A side edge E1 in the +X direction and a side edge E2 in the −X direction are formed into a straight line shape in the Y axis direction. Similarly, a side edge E3 in the +Y direction and a side edge E4 in the −Y direction are formed into a straight line shape in the X axis direction. Accordingly, measurement can be performed by placing a ruler on each side edge and sliding the color measurement apparatus 1 along the ruler. From the above reason, the bottom first casing 53A and the bottom second casing 53B are preferably formed of a resin material having low frictional resistance. For example, polyoxymethylene (POM) can be employed.

Substrate Configuration of Color Measurement Apparatus 1

Next, a substrate configuration of the color measurement apparatus 1 will be described.

Figure 7:
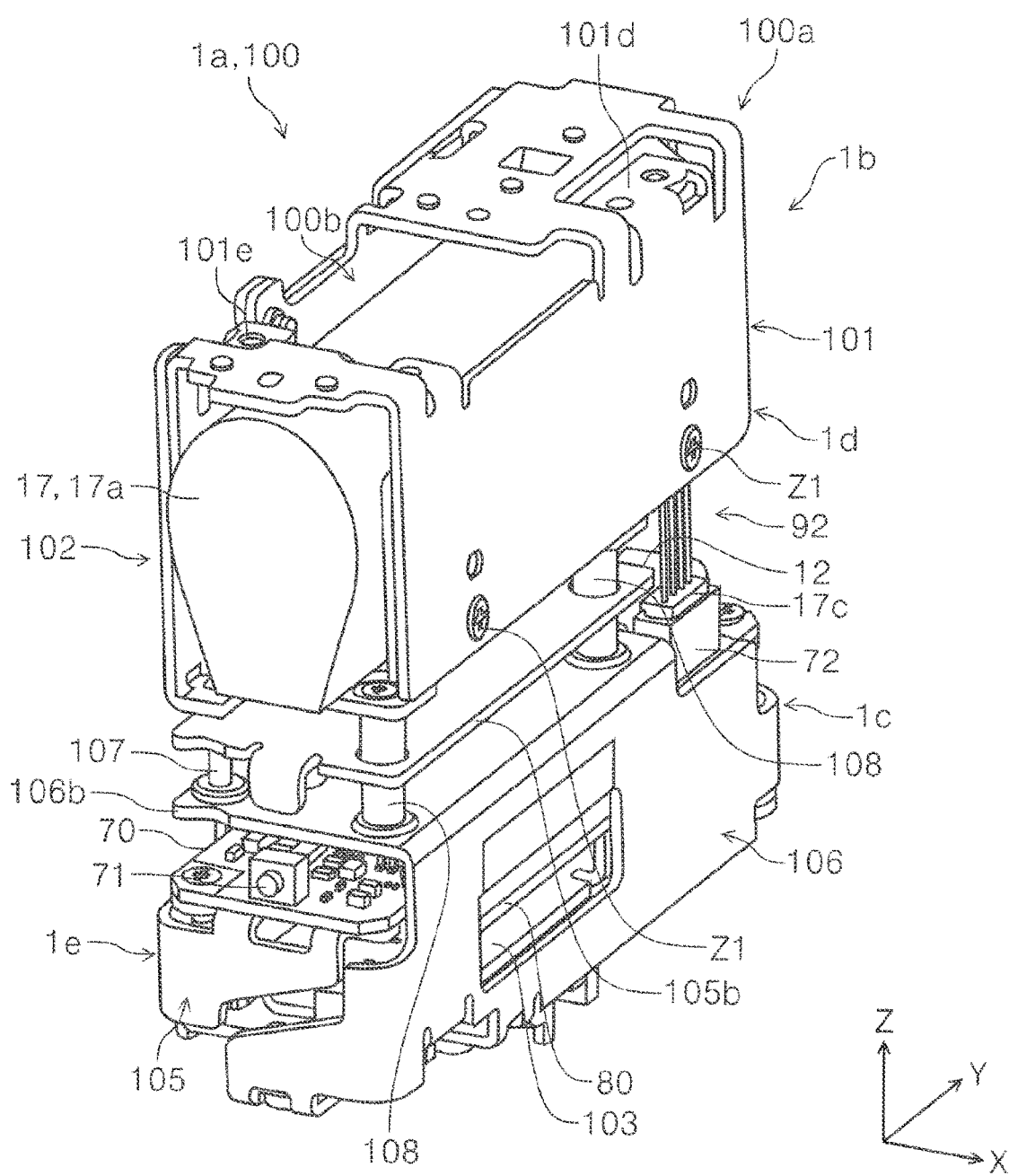
FIG. 7 is a perspective view of an apparatus internal unit viewed from above.
Figure 8:
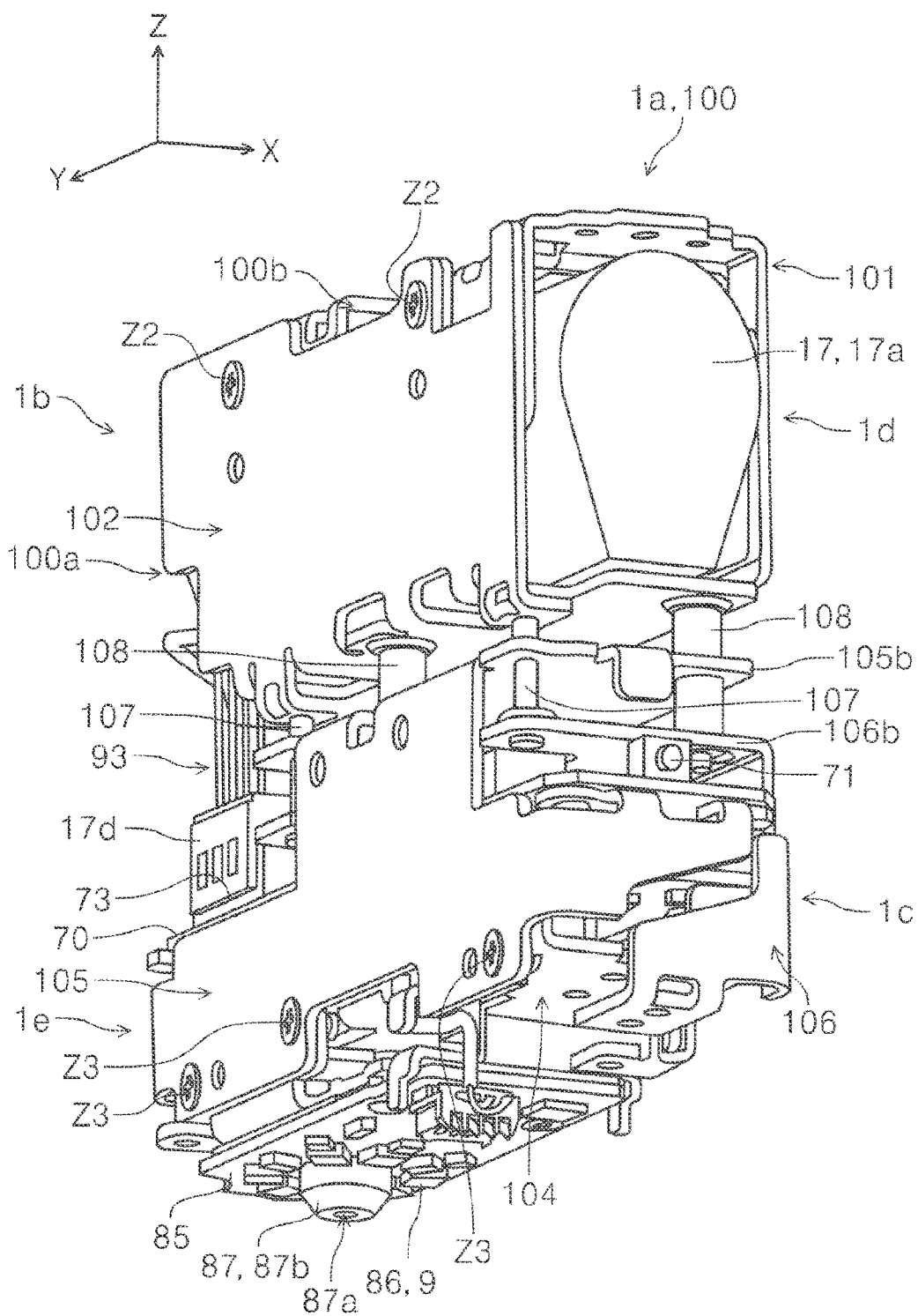
FIG. 8 is a perspective view of the apparatus internal unit viewed from below.

The apparatus internal unit 1*a* illustrated in FIG. 7 and FIG. 8 is an assembly body disposed inside the main casing 51 and is configured by assembling a battery, a plurality of circuit substrates, and the like in a frame assembly 100 that is an assembly of a plurality of frames. In FIG. 7 and FIG. 8, a panel substrate 65 positioned in the uppermost portion is not illustrated.

As illustrated in FIG. 9, the plurality of circuit substrates are configured with the panel substrate 65 as a "fourth circuit substrate", a battery control substrate 70 as a "third circuit substrate", a light reception portion substrate 80 as a "first circuit substrate", and a light emission portion substrate 85 as a "second circuit substrate" in order from above to below. The plurality of circuit substrates are disposed to overlap at intervals in the Z axis direction. The battery 17 is arranged between the panel substrate 65 and the battery control substrate 70 in the Z axis direction.

Hereinafter, each circuit substrate and a peripheral configuration will be described. Hereinafter, a surface of each circuit substrate in the +Z direction may be referred to as an "upper surface", and a surface of each circuit substrate in the −Z direction may be referred to as a "lower surface".

Figure 11:
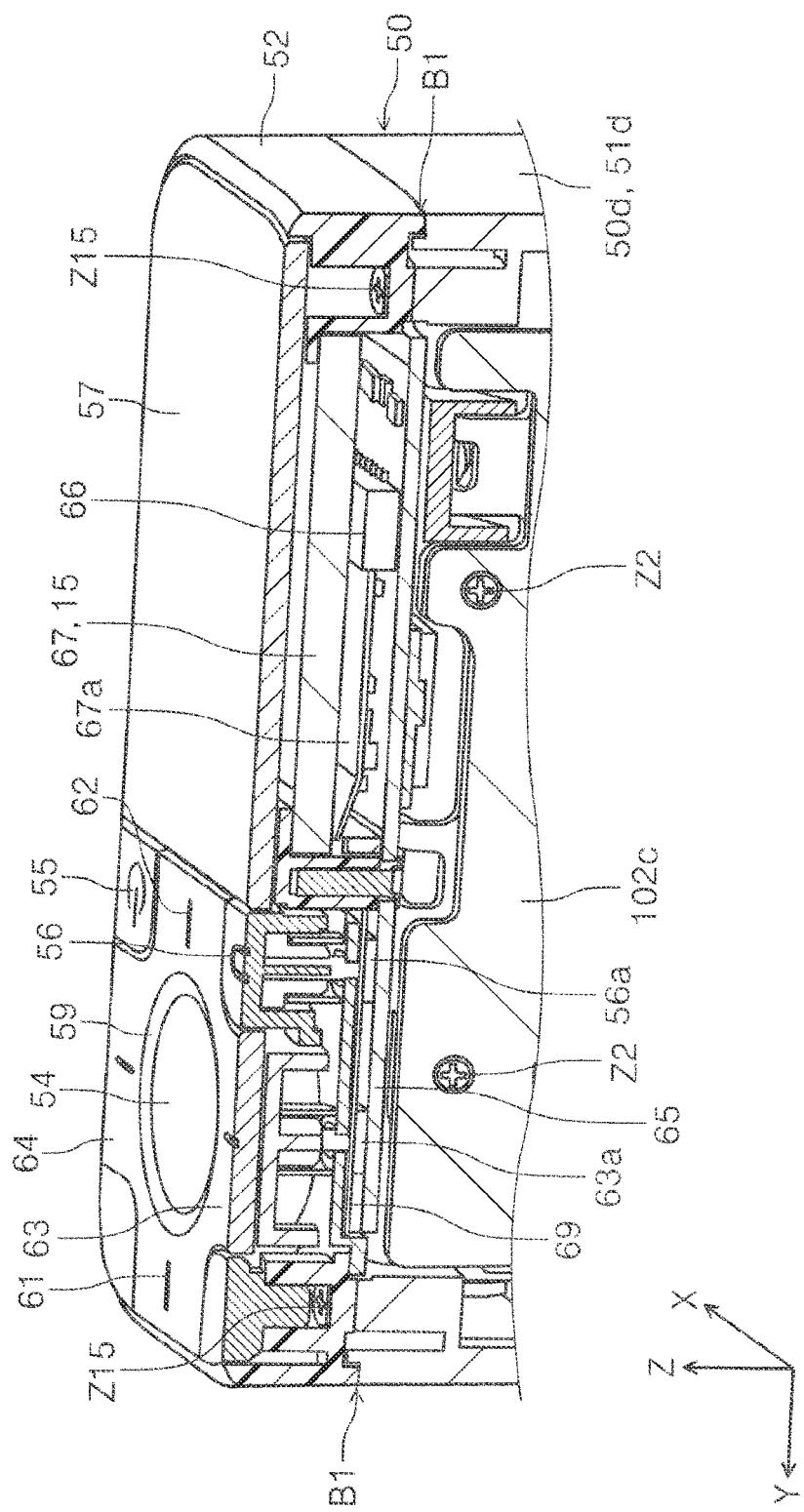
FIG. 11 is a cross-sectional perspective view of an upper portion of the apparatus.

The panel substrate 65 includes a LCD coupling portion 66 on the upper surface thereof as illustrated in FIG. 9 and FIG. 11. The LCD 67 is coupled to the LCD coupling portion 66 by a cable 67*a*.

In addition, a contact for detecting a push of each operation button is disposed on the upper surface of the panel substrate 65 at a position corresponding to each operation button constituting the operation portion 14. In FIG. 9, reference sign 54*a* denotes a contact disposed at a position corresponding to the decision button 54. Reference signs 61*a* and 62*a* denote contacts disposed at positions corresponding to the up button 61 and the down button 62, respectively. In addition, in FIG. 11, reference sign 56*a* denotes a contact disposed at a position corresponding to the return button 56, and reference sign 63*a* denotes a contact disposed at a position corresponding to the left button 63. Contacts not illustrated in FIG. 9 and FIG. 11, that is, contacts corresponding to the right button 64 and the power button 55, are also disposed on the upper surface of the panel substrate 65.

As illustrated in FIG. 11, a sheet material 69 is disposed between each contact disposed on the upper surface of the panel substrate 65 and each button constituting the operation portion 14. The sheet material 69 exhibits a waterproof function for each contact disposed on the upper surface of the panel substrate 65, and a function of each contact is maintained. For example, a rubber sheet can be employed as the sheet material 69.

In addition, as illustrated in FIG. 9, the wireless communication portion 13 that is a communication module is disposed on the lower surface of the panel substrate 65. The wireless communication portion 13 is arranged to enter inside a battery holding portion 100*a* (refer to FIG. 7), described later, through a notch portion 100*b* formed in the battery holding portion 100*a* as illustrated in FIG. 9.

The panel substrate 65 is coupled to the light reception portion substrate 80, described later, by a cable not illustrated.

Figure 13:
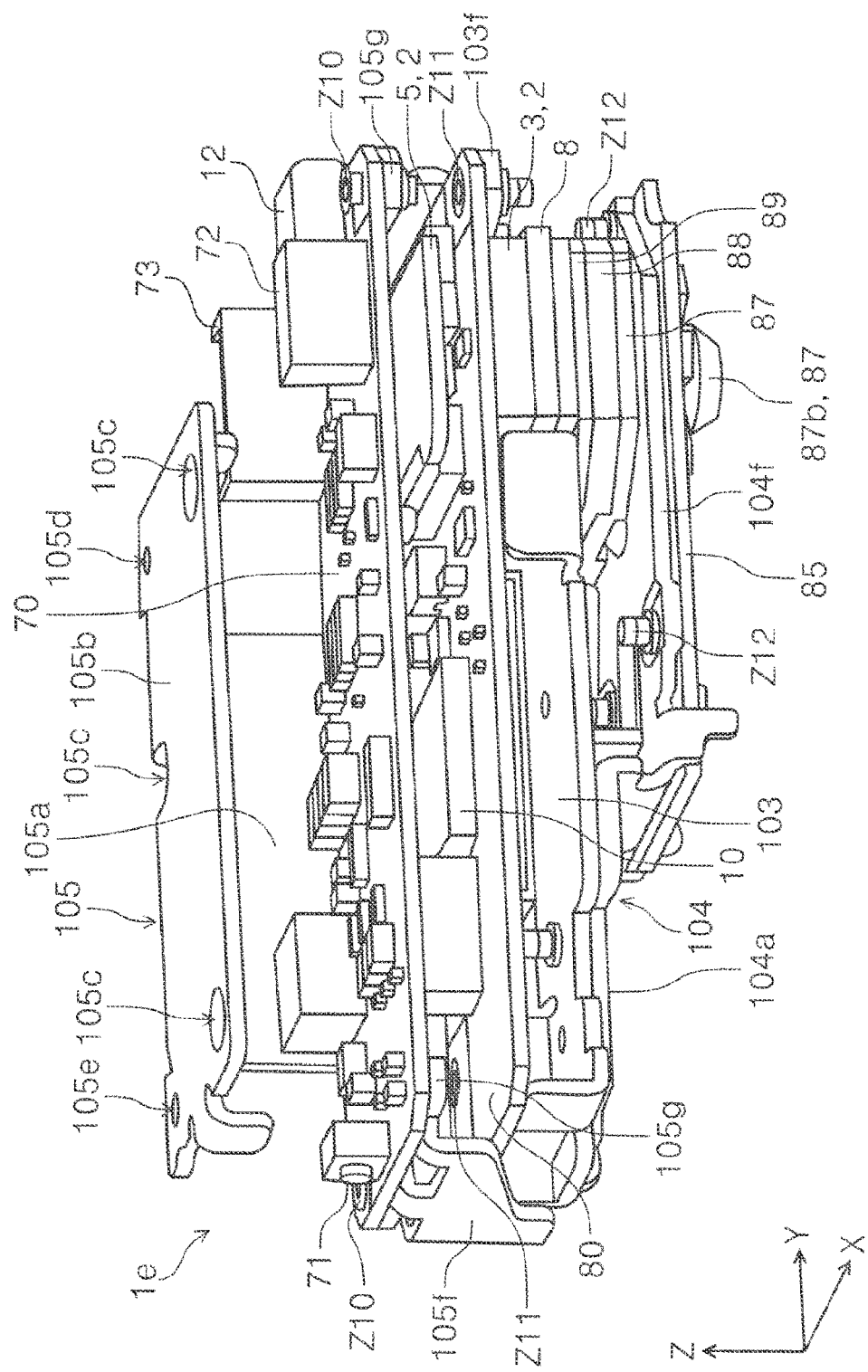
FIG. 13 is a perspective view of the movable unit.

Next, the battery control substrate 70 implements a function of the battery control portion 16 (refer to FIG. 1). As illustrated in FIG. 7 and FIG. 13, the battery control substrate 70 includes a reset switch 71 and a wired IF 12 on the upper surface thereof. In addition, the battery control substrate 70 includes a first battery connector 72 on the upper surface thereof. As illustrated in FIG. 7, a first connector 17*c* that is attached to a first battery cable 92 extending from the battery 17 fits in the first battery connector 72. In addition, as illustrated in FIG. 8, the battery control substrate 70 includes a second battery connector 73 on the upper surface thereof. A second connector 17*d* that is attached to a second battery cable 93 extending from the battery 17 fits in the second battery connector 73.

Furthermore, a battery control circuit, not illustrated, is disposed on the upper surface of the battery control substrate 70.

The battery control substrate 70 is coupled to the light reception portion substrate 80 and the light emission portion substrate 85 by a coupling section not illustrated. Accordingly, power of the battery 17 is supplied to each substrate.

Next, as illustrated in FIG. 9, FIG. 10, and FIG. 13, the light reception portion substrate 80 includes a photo diode (PD) substrate 5 on the upper surface thereof.

The PD substrate 5 includes the photo diode 4*a* on the lower surface thereof. The PD substrate 5 is a circuit substrate constituting the light reception portion 4 (refer to FIG. 1). That is, the PD substrate 5 constitutes the incident light processing portion 2 (refer to FIG. 1) that processes incident light.

Figure 14:
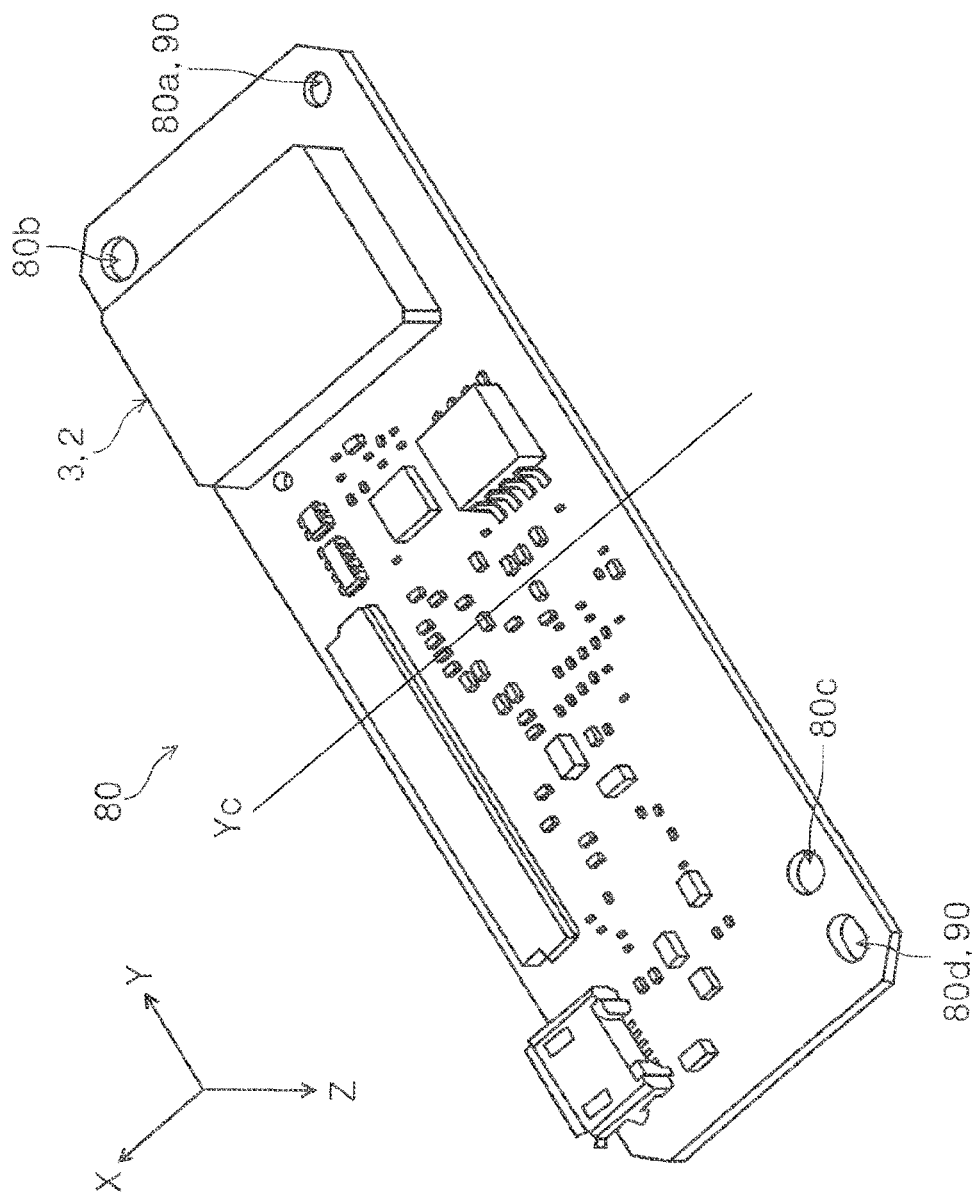
FIG. 14 is a perspective view of a light reception portion substrate.

In addition, as illustrated in FIG. 14, the light reception portion substrate 80 includes the optical filter 3 on the lower surface thereof.

Furthermore, various electronic components are disposed in the light reception portion substrate 80 and include the MCU 10 (refer to FIG. 1), a CV converter constituting the electrostatic capacitance detection portion 6 (refer to FIG. 1), a DC/DC converter that converts a voltage of the battery 17, an amplifier that adjusts an output from the DC/DC converter under control of the MCU 10 and supplies the adjusted output to the optical filter 3, a temperature sensor for detecting a temperature around the optical filter 3, and the like.

Figure 12:
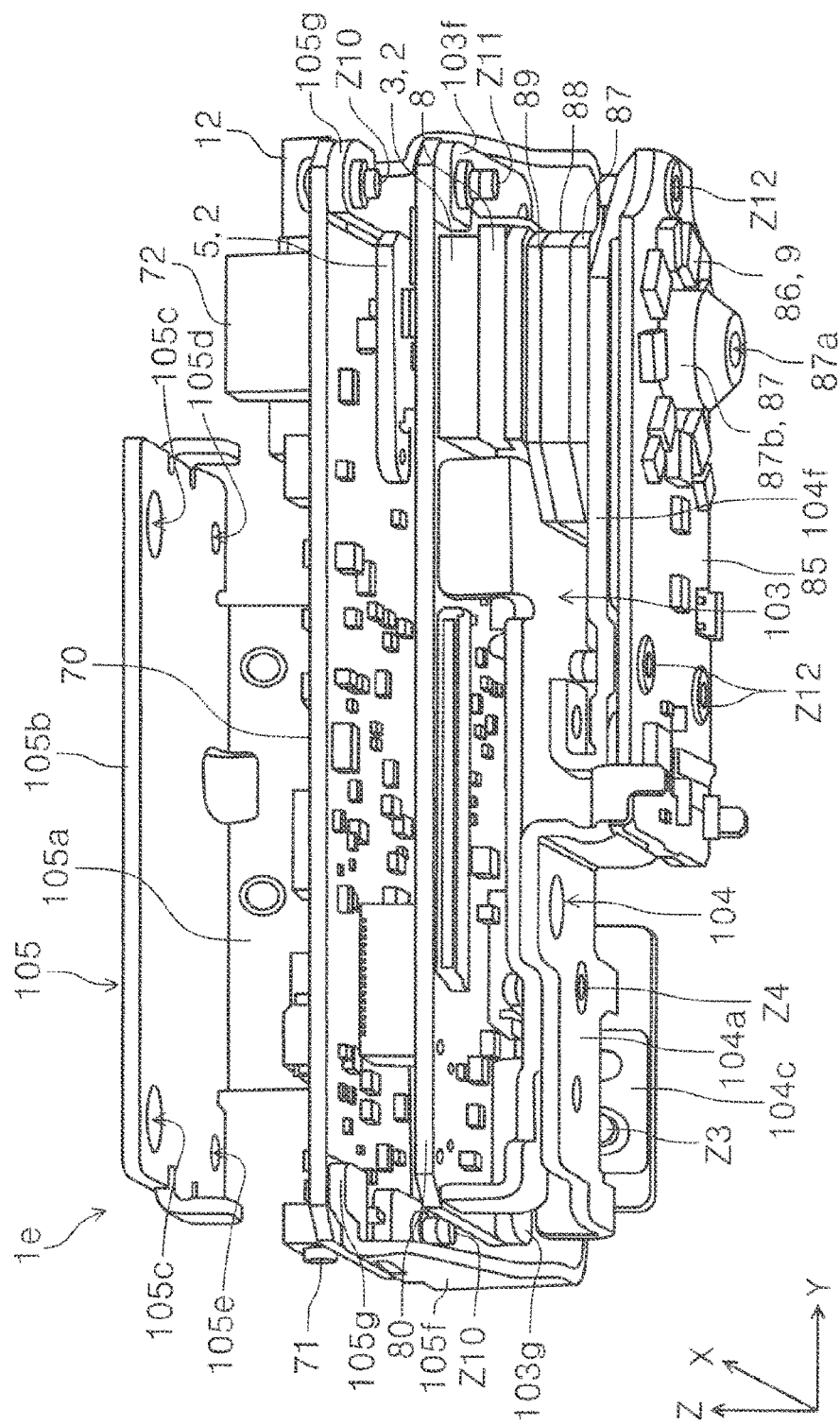
FIG. 12 is a perspective view of a movable unit.

Next, as illustrated in FIG. 12, a plurality of light emission elements 86 are disposed on the lower surface of the light emission portion substrate 85. The light emission elements 86 constitute the light emission portion 9 (refer to FIG. 1). The plurality of light emission elements 86 are configured with light emission elements having different wavelength distributions for light emission. The light emission portion substrate 85 includes a hole through which the cylindrical portion 87b of the light condensing member 87 is inserted. The plurality of light emission elements 86 are disposed around the hole.

Frame Configuration of Apparatus Internal Unit

Next, the frame assembly 100 constituting a base body of the apparatus internal unit 1a will be described.

As illustrated in FIG. 7, FIG. 8, and FIG. 21 to FIG. 24, the frame assembly 100 is configured to include a first battery holding frame 101, a second battery holding frame 102, a light reception portion substrate holding frame 103, a light emission portion substrate holding frame 104, a movable frame 105, and a bottom frame 106. In the present embodiment, each frame is assembled by screws.

In the present embodiment, all frames are formed by folding a metal material. For example, aluminum is used as the material. Instead of folding the metal material, each frame can be created by die casting or the like.

Hereinafter, each frame will be described in order. The first battery holding frame 101 is a frame constituting the battery holding portion 100a and includes a first vertical portion 101a having a frame surface parallel to the Y-Z plane, a horizontal portion 101b having a frame surface parallel to the X-Y plane, and a second vertical portion 101c having a frame surface parallel to the Y-Z plane.

The horizontal portion 101b supports the panel substrate 65 from below as illustrated in FIG. 9. The panel substrate 65 is fixed to the horizontal portion 101b by a screw not illustrated. The panel substrate 65 is in surface contact with the horizontal portion 101b. Accordingly, heat of the panel substrate 65 is transferred to the horizontal portion 101b, that is, the first battery holding frame 101.

In a +Y direction end portion of the horizontal portion 101b, a battery regulation portion 101f is formed to extend in the -Z direction from the horizontal portion 101b as illustrated in FIG. 9. The battery regulation portion 101f regulates movement of the battery 17 in the +Y direction.

Next, the second battery holding frame 102 constitutes the battery holding portion 100a together with the first battery holding frame 101. Screws Z1 and Z2 are screws for assembling the first battery holding frame 101 and the second battery holding frame 102.

The second battery holding frame 102 includes a battery support portion 102a having a frame surface parallel to the X-Y plane, a first vertical portion 102b having a frame surface parallel to the Y-Z plane, and a second vertical portion 102c having a frame surface parallel to the Y-Z plane.

The battery support portion 102a supports the battery 17 from below. A bottom surface of the battery 17 is in surface contact with the battery support portion 102a. Accordingly, heat of the battery 17 is transferred to the battery support portion 102a, that is, the battery holding portion 100a.

A battery positioning portion 102d is formed in the battery support portion 102a by bending. Accordingly, it is configured that a position of the battery 17 in the X axis direction is decided.

The first vertical portion 102b is positioned in the -X direction with respect to the first vertical portion 101a of the first battery holding frame 101 and is in surface contact with the first vertical portion 101a. In addition, the second vertical portion 102c is positioned in the -X direction with respect to the second vertical portion 101c of the first battery holding frame 101 and is in surface contact with the second vertical portion 101c.

In such a manner, the battery holding portion 100a is configured to surround the battery 17 by the first battery holding frame 101 and the second battery holding frame 102.

In the battery holding portion 100a, an elastic material 28 is disposed between the horizontal portion 101b and the battery 17 as illustrated in FIG. 9. The elastic material 28 is also interposed between the battery regulation portion 101f and a first end portion 17a that is a +Y direction end portion of the battery 17. In addition, the elastic material 28 is also interposed between a rear inner wall surface 51f of the main casing 51 and a second end portion 17b that is a -Y direction end portion of the battery 17. Accordingly, the position of the battery 17 in the Y direction in the battery holding portion 100a is regulated. For example, a sponge can be used as the elastic material 28.

Here, with reference to FIG. 31, the battery support portion 102a constitutes a first wall portion W1 that supports the battery 17 from below. In addition, the horizontal portion 101b constitutes a second wall portion W2 that faces the battery support portion 102a and is positioned above the battery 17. In addition, the battery holding portion 100a includes a third wall portion W3 and a fourth wall portion W4 that are positioned on sides of the battery 17 such that the battery 17 is interposed therebetween. The third wall portion W3 is configured with the second vertical portion 101c and the second vertical portion 102c. The fourth wall portion W4 is configured with the first vertical portion 101a and the first vertical portion 102b.

In FIG. 31, a first corner portion C1 in which the first wall portion W1 intersects with the third wall portion W3, a second corner portion C2 in which the first wall portion W1 intersects with the fourth wall portion W4, a third corner portion C3 in which the second wall portion W2 intersects with the fourth wall portion W4, and a fourth corner portion C4 in which the second wall portion W2 intersects with the third wall portion W3 are formed inside the battery holding portion 100a.

Next, with reference to FIG. 7, the apparatus internal unit 1a includes a fixed unit 1b and a movable unit 1e. The fixed unit 1b is a unit body that is fixed to the main casing 51 and the opening portion forming member 21 (refer to FIG. 9). The movable unit 1e is a unit body that is disposed to be displaceable in the Z axis direction with respect to the fixed unit 1b.

The fixed unit 1b includes a first unit 1c coupled to the opening portion forming member 21 and a second unit 1d that is positioned on a side away from the opening portion forming member 21 with respect to the first unit 1c in the Z axis direction and is coupled to the first unit 1c in a state of having an interval with the first unit 1c in the Z axis direction.

The second unit 1d is configured with the battery holding portion 100a and the battery 17. The first unit 1c is configured with the bottom frame 106.

Figure 25:
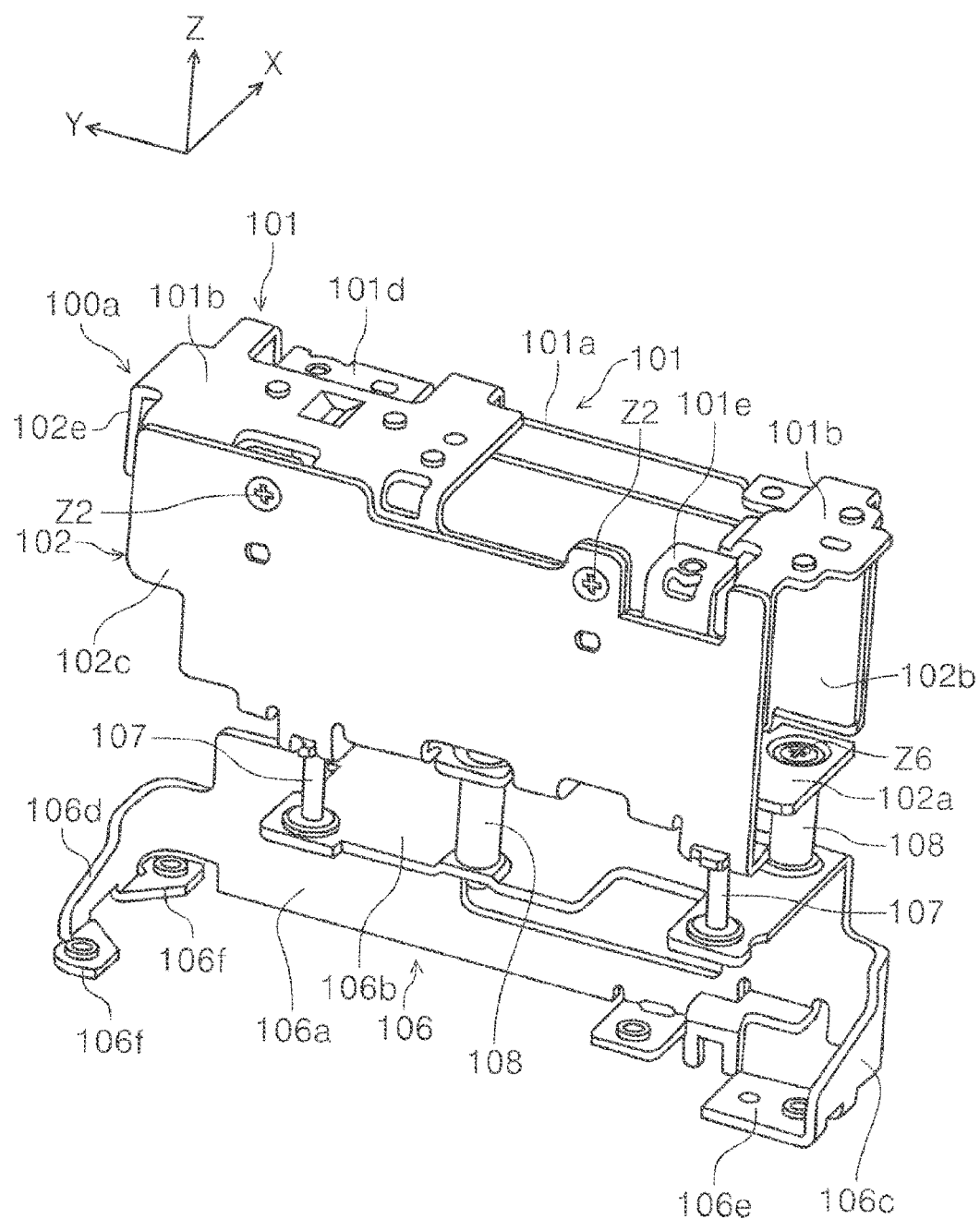
FIG. 25 is a perspective view of a frame constituting a fixed unit.

FIG. 25 illustrates a frame assembly constituting the fixed unit 1b. The frame assembly constituting the fixed unit 1b is configured by coupling the battery holding portion 100a to the bottom frame 106.

More specifically, the bottom frame 106 is formed to include a base portion 106a having a frame surface parallel to the Y-Z plane and a guide support portion 106b having a frame surface parallel to the X-Y plane.

Two guide shafts 107 are fixed to the guide support portion 106b. In the present embodiment, the guide shafts 107 are metal shafts extending in the Z axis direction and are fixed to holes (not illustrated) formed in the guide support portion 106b by swaging. The guide shafts 107 extend in the +Z direction from the guide support portion 106b up to positions at which +Z direction end portions thereof are in almost the same plane as an upper surface of the battery support portion 102a. A hole (not illustrated) through which the guide support portion 106b is inserted is formed in the battery support portion 102a.

Three screw holes (not illustrated) for fixing screws Z6 (refer to FIG. 24) are formed in the guide support portion 106b. The three screws Z6 are fixed to the screw holes, respectively, in a state where the three screws Z6 are inserted through pipes 108. Accordingly, the battery holding portion 100a is coupled to the bottom frame 106.

In the present embodiment, the pipes 108 are metal pipes. The pipes 108 define an interval between the battery holding portion 100a and the bottom frame 106 in the Z axis direction. In addition, the pipes 108 and the screws Z6 transfer heat between the battery holding portion 100a and the bottom frame 106.

In such a manner, the battery holding portion 100a and the bottom frame 106 are coupled in a state of having an interval in the Z axis direction. That is, the first unit 1c and the second unit 1d are coupled in a state of having an interval in the Z axis direction.

In the present specification, a "screw hole", unless otherwise specified, means a hole in which a spiral groove is formed in order to fix a screw. A "screw insertion through-hole", unless otherwise specified, means a hole in which a spiral groove is not formed and is used for simply inserting a screw therethrough.

Next, a folded portion 106c is formed to extend in the −X direction from a −Y direction end portion of the base portion 106a in the bottom frame 106. Furthermore, a coupling portion 106e is formed to extend in the +Y direction from the folded portion 106c. Similarly, a folded portion 106d is formed to extend in the −X direction from a +Y direction end portion of the base portion 106a. Furthermore, two coupling portions 106f are formed to extend in the −Y direction from the folded portion 106d (refer to FIG. 23 as well).

The opening portion forming member 21 is fixed by screws to the coupling portions 106e and 106f. For example, in FIG. 9, a screw denoted by reference sign Z14 is a screw for fixing the opening portion forming member 21 to the coupling portion 106e. In the present embodiment, the screw Z14 fixes two members of the bottom first casing 53A and the opening portion forming member 21 to the coupling portion 106e. A +Y direction end portion of the opening portion forming member 21 is fixed to the coupling portions 106f by screws not illustrated.

In the present embodiment, the opening portion forming member 21 is formed of a metal material, for example, aluminum. Accordingly, heat of the bottom frame 106 is transferred to the opening portion forming member 21. Since the bottom frame 106 is coupled to the battery holding portion 100a through the pipes 108 and the screws Z6 (refer to FIG. 24), heat generated in the battery 17 is radiated outside the apparatus even through the bottom frame 106 and the opening portion forming member 21.

The opening portion forming member 21 can also be formed of a resin material.

Next, a configuration of the movable unit 1e constituting the apparatus internal unit 1a will be mainly described with reference to FIG. 12, FIG. 13 and FIG. 26 to FIG. 29 and also with reference to other drawings as needed.

In FIG. 12 and FIG. 13, a base body of the movable unit 1e is configured with frames including the movable frame 105, the light reception portion substrate holding frame 103, and the light emission portion substrate holding frame 104. A plurality of substrates including the battery control substrate 70, the light reception portion substrate 80, and the light emission portion substrate 85 are included on the base body.

Figure 26:
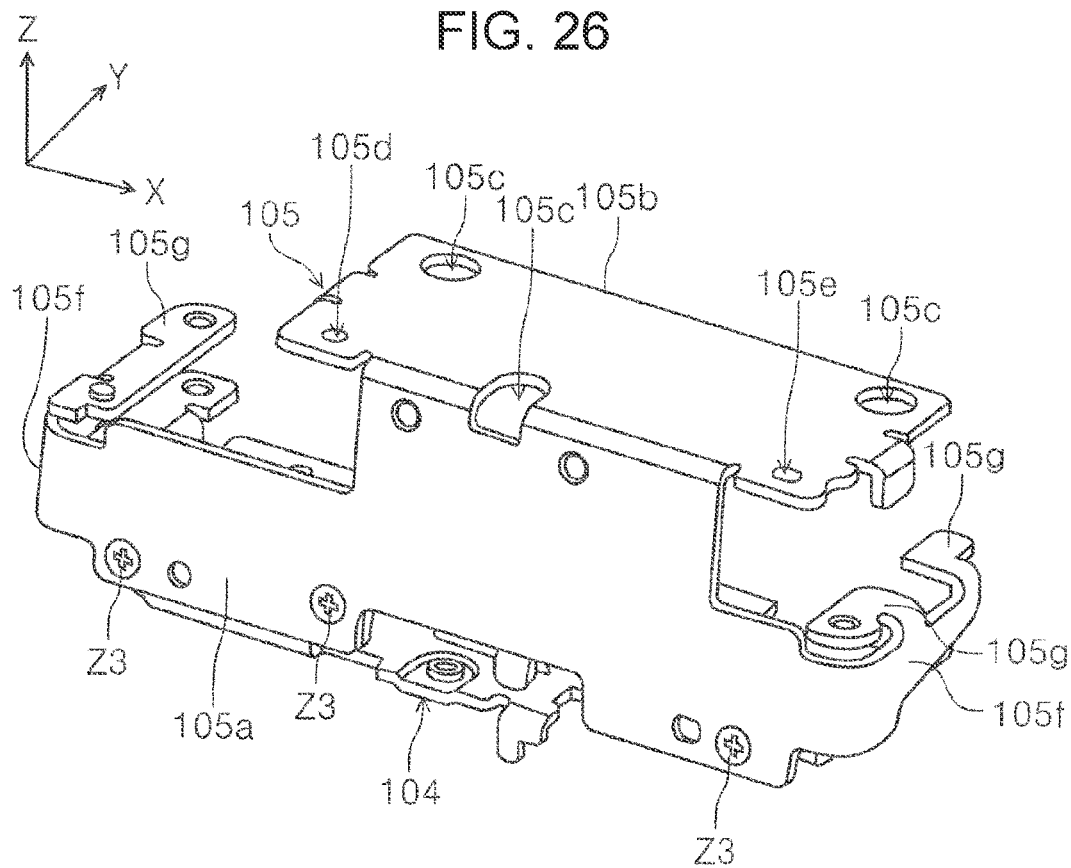
FIG. 26 is a perspective view of the frame constituting the movable unit.
Figure 27:
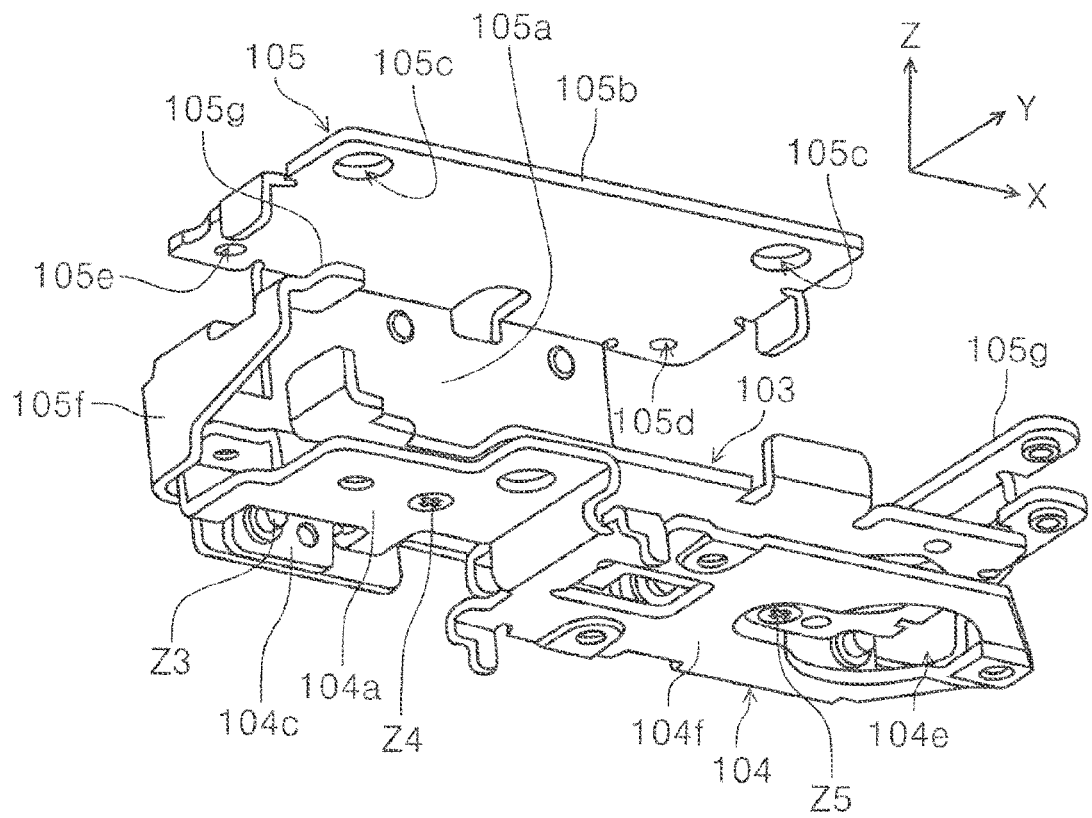
FIG. 27 is a perspective view of the frame constituting the movable unit.
Figure 28:
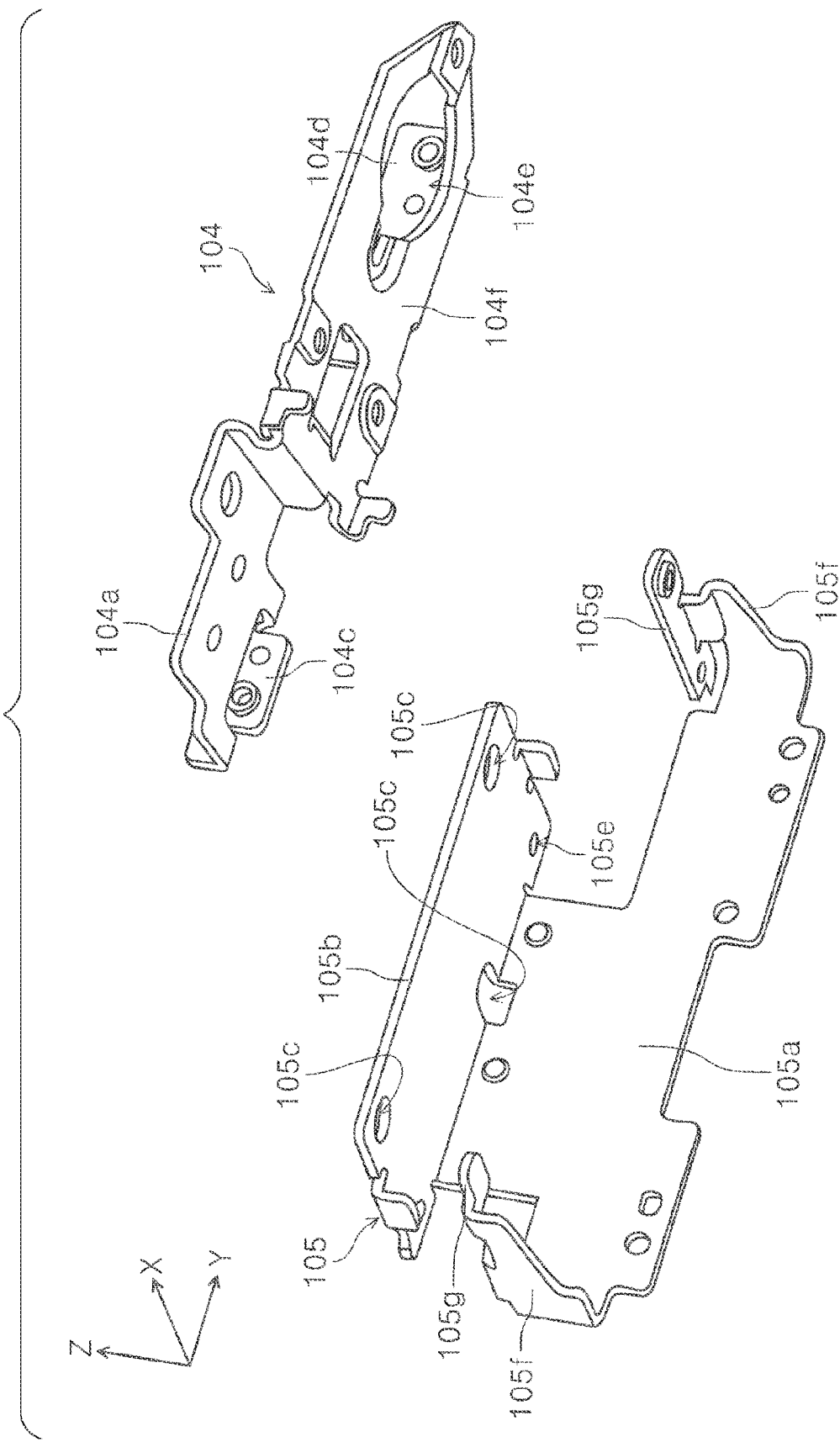
FIG. 28 is an exploded perspective view of a movable frame and a light emission portion substrate holding frame.

In FIG. 26, FIG. 27, and FIG. 28, the movable frame 105 includes a frame fixing portion 105a having a frame surface parallel to the Y-Z plane and a guided portion 105b having a frame surface parallel to the X-Y plane. Folded portions 105f are formed by folding both of a −Y direction end portion and a +Y direction end portion of the frame fixing portion 105a in the +X direction. Substrate support portions 105g having frame surfaces parallel to the X-Y plane are formed in the folded portions 105f.

As illustrated in FIG. 12 and FIG. 13, the substrate support portions 105g support the battery control substrate 70. The battery control substrate 70 is fixed to the substrate support portions 105g by two screws Z10. The battery control substrate 70 is in surface contact with the substrate support portions 105g. Accordingly, heat of the battery control substrate 70 is transferred to the movable frame 105.

Three pipe insertion through-holes 105C and two guided holes 105d are formed in the guided portion 105b. These holes will be described later.

Figure 29:
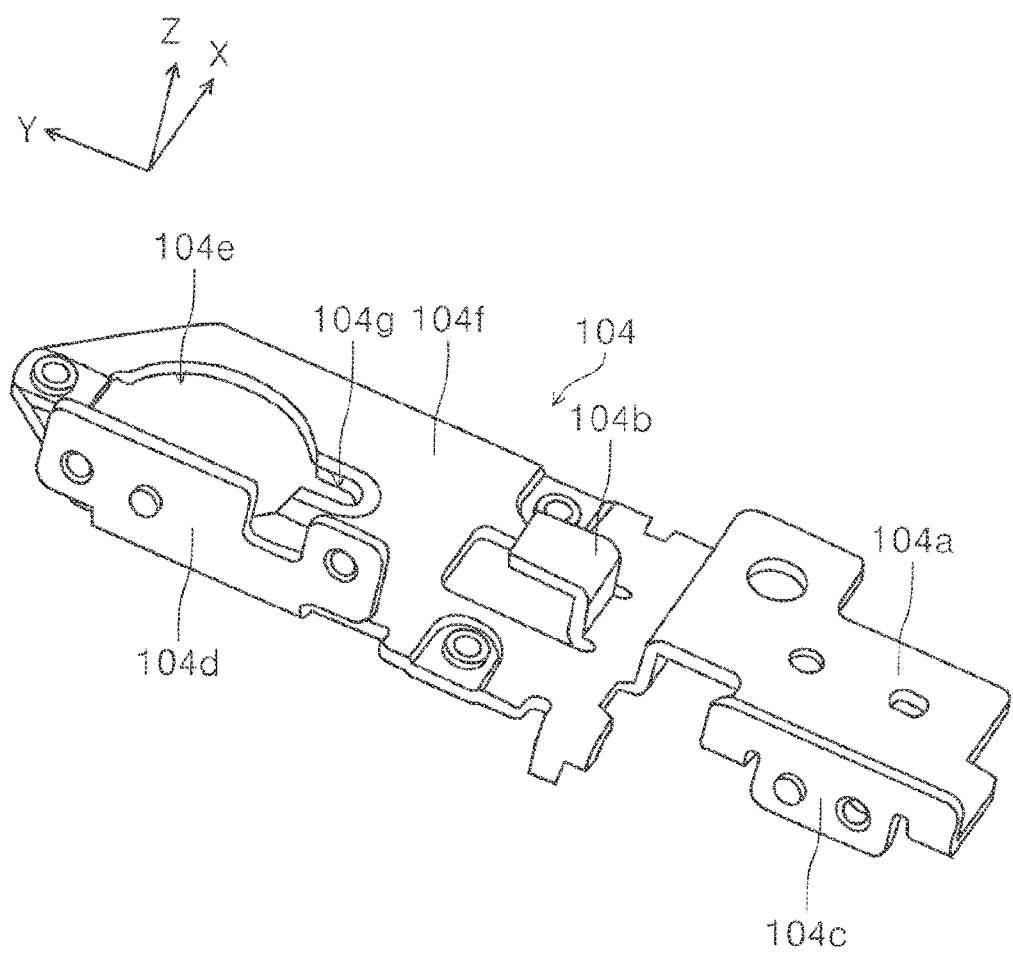
FIG. 29 is a perspective view of the light emission portion substrate holding frame.

Next, as illustrated in FIG. 29, the light emission portion substrate holding frame 104 includes a base portion 104f having a frame surface parallel to the X-Y plane and frame support portions 104a and 104b that are formed at positions slightly higher than the base portion 104f in the +Z direction and have frame surfaces parallel to the X-Y plane.

An opening portion 104e and a screw insertion through-hole 104g are formed in the base portion 104f. The opening portion 104e functions as a passage through the light condensing member 87 in the −Z direction (refer to FIG. 12). The light emission portion substrate 85 is fixed to a lower surface of the base portion 104f by three screws Z12 (refer to FIG. 12). The light emission portion substrate 85 is in surface contact with the base portion 104f. Accordingly, heat of the light emission portion substrate 85 is transferred to the light emission portion substrate holding frame 104.

In addition, a coupling portion 104d having a frame surface parallel to the Y-Z plane is formed in a −X direction end portion of the base portion 104f. Similarly, a coupling portion 104c having a frame surface parallel to the Y-Z plane is formed in a −X direction end portion of the frame support portion 104a.

The coupling portions 104c and 104d are fixed to the frame fixing portion 105a of the movable frame 105 by screws Z3 (refer to FIG. 26). The coupling portions 104c and 104d are in surface contact with the frame fixing portion 105a. Accordingly, heat of the light emission portion substrate holding frame 104 is transferred to the movable frame 105.

As illustrated in FIG. 27, the frame support portions 104a and 104b support the light reception portion substrate holding frame 103. A screw denoted by reference sign Z4 is a screw for fixing the light reception portion substrate holding frame 103 to the frame support portion 104a. A screw Z5 illustrated in FIG. 27 will be described later.

The light reception portion substrate holding frame 103 is in surface contact with the frame support portions 104a and 104b. Accordingly, heat of the light reception portion substrate holding frame 103 is transferred to the light emission portion substrate holding frame 104.

Figure 15:
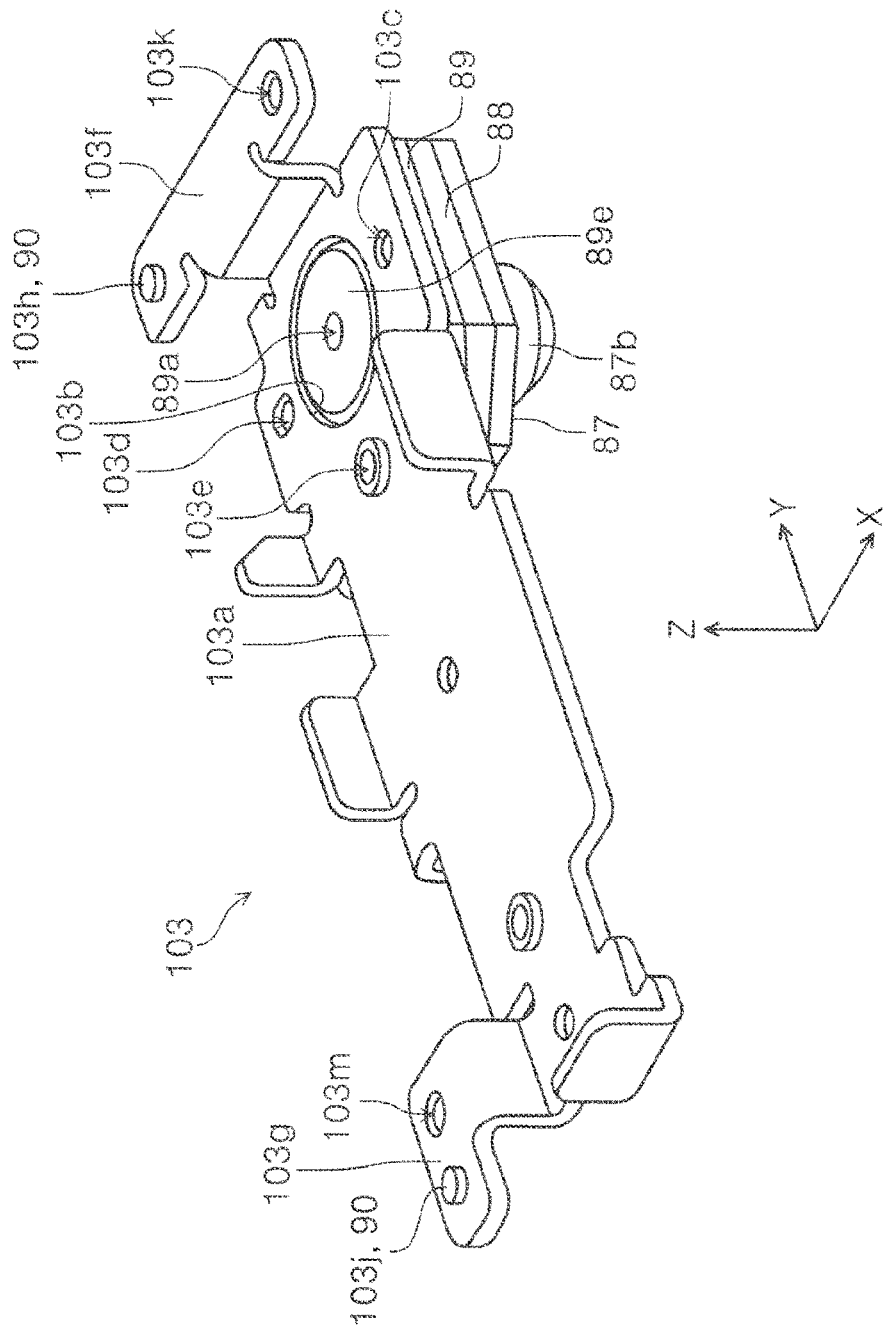
FIG. 15 is a perspective view of a light reception portion substrate holding frame.
Figure 16:
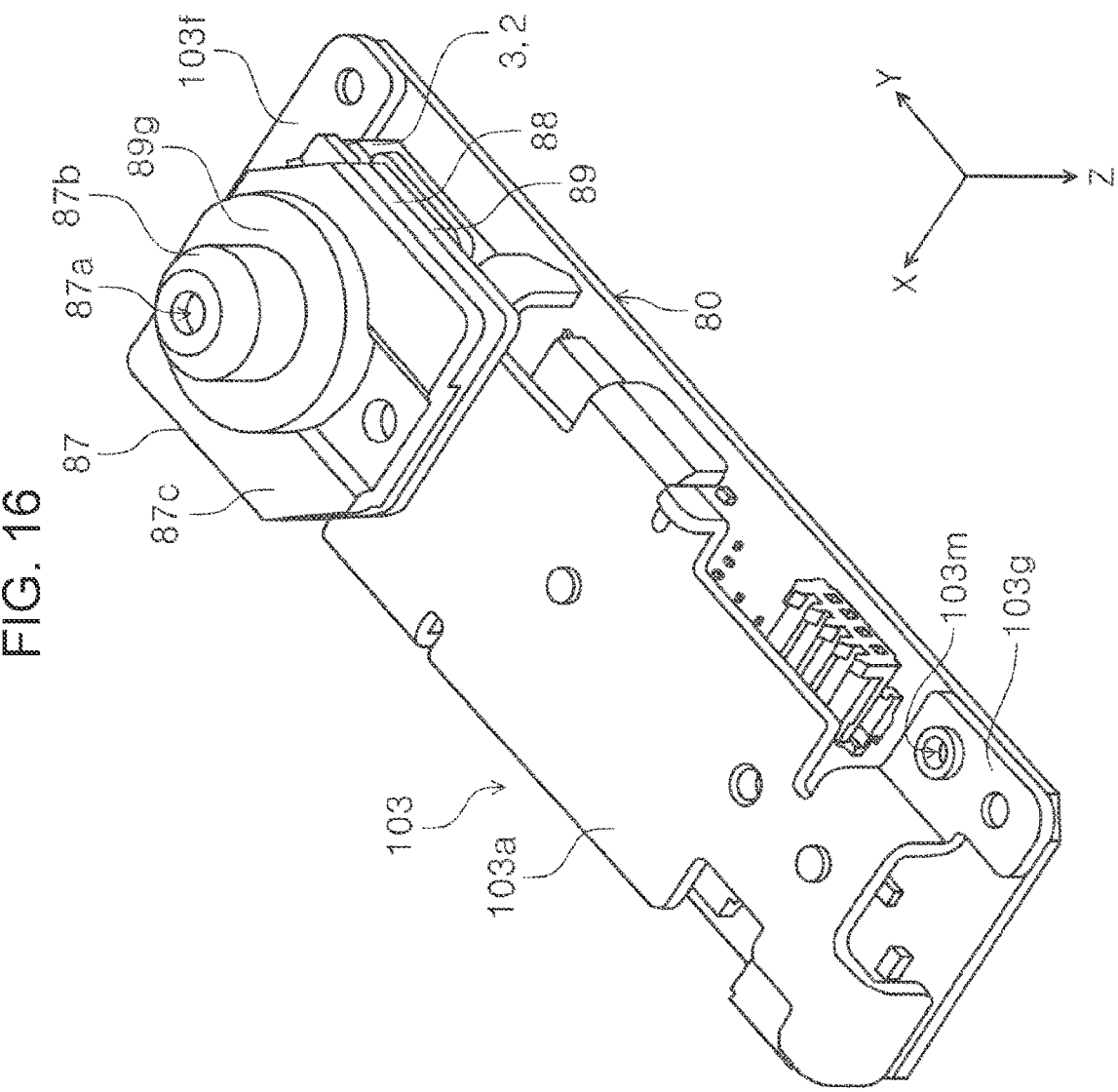
FIG. 16 is a perspective view of the light reception portion substrate and the light reception portion substrate holding frame.
Figure 17:
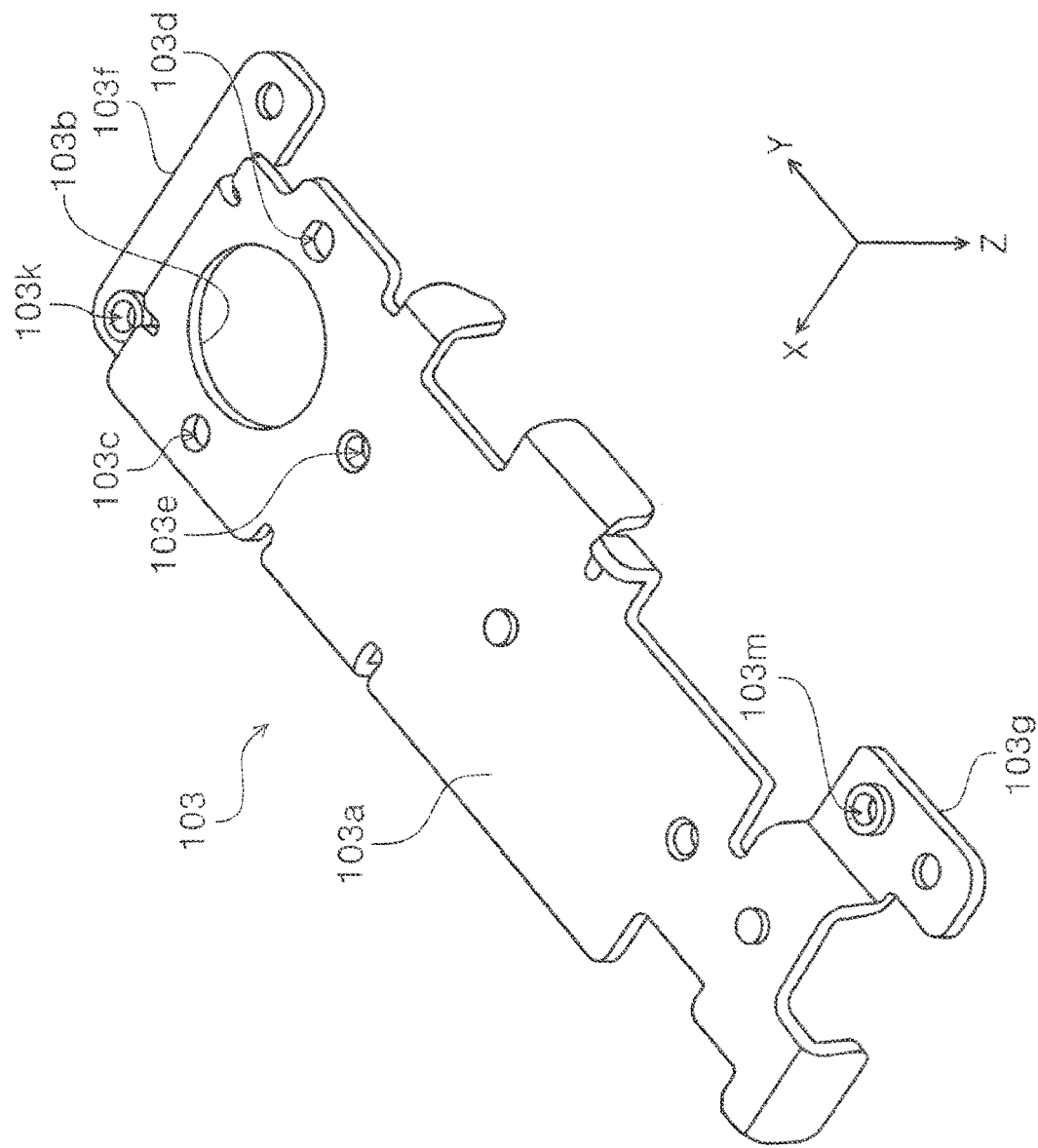
FIG. 17 is a perspective view of the light reception portion substrate holding frame.

Next, as illustrated in FIG. 15, FIG. 16, and FIG. 17, the light reception portion substrate holding frame 103 includes a base portion 103a having a frame surface parallel to the X-Y plane and substrate support portions 103f and 103g that are formed at positions slightly higher than the base portion 103a in the +Z direction. The substrate support portions 103f and 103g support the light reception portion substrate 80. The substrate support portions 103f and 103g are in surface contact with the light reception portion substrate 80. Accordingly, heat of the light reception portion substrate 80 is transferred to the light reception portion substrate holding frame 103.

An opening portion 103b, a positioning hole 103c, and a long hole 103d that is long in the X axis direction are formed in the base portion 103a of the light reception portion substrate holding frame 103. In addition, a screw hole 103k and a projection portion 103h are formed in the substrate support portion 103f. A screw hole 103m and a projection portion 103j are formed in the substrate support portion 103g.

As illustrated in FIG. 14, a positioning hole 80a and a screw insertion through-hole 80b are formed in a +Y direction end portion of the light reception portion substrate 80. The projection portion 103h of the light reception portion substrate holding frame 103 fits in the positioning hole 80a. A screw Z11 (refer to FIG. 13) for fixing the light reception portion substrate 80 to the substrate support portion 103f is inserted through the screw insertion through-hole 80b.

In addition, as illustrated in FIG. 14, a screw insertion through-hole 80c and a long hole 80d that is long in the Y axis direction are formed in a −Y direction end portion of the light reception portion substrate 80. The screw Z11 (refer to FIG. 13) for fixing the light reception portion substrate 80 to the substrate support portion 103g is inserted through the screw insertion through-hole 80c. The projection portion 103j of the light reception portion substrate holding frame 103 fits in the long hole 80d.

Positions of the light reception portion substrate holding frame 103 and the light reception portion substrate 80 in the X axis direction are defined by fitting the projection portion 103h in the positioning hole 80a and fitting the projection portion 103j in the long hole 80d. The long hole 80d is a hole that is long in the Y axis direction. Thus, the positions of the light reception portion substrate holding frame 103 and the light reception portion substrate 80 in the Y axis direction are defined by fitting the projection portion 103h in the positioning hole 80a.

As described above, the positioning hole 80a, the projection portion 103h, the long hole 80d, and the projection portion 103j constitute a positioning section 90 that decides a relative position between the light reception portion substrate 80 and the light reception portion substrate holding frame 103 in the direction intersecting with the Z axis direction.

Next, as illustrated in FIG. 15, a reduction portion forming member 89, an intermediate member 88, and the light condensing member 87 are positioned in the light reception portion substrate holding frame 103. In the present embodiment, all of the reduction portion forming member 89, the intermediate member 88, and the light condensing member 87 are formed of a black resin material.

Figure 19:
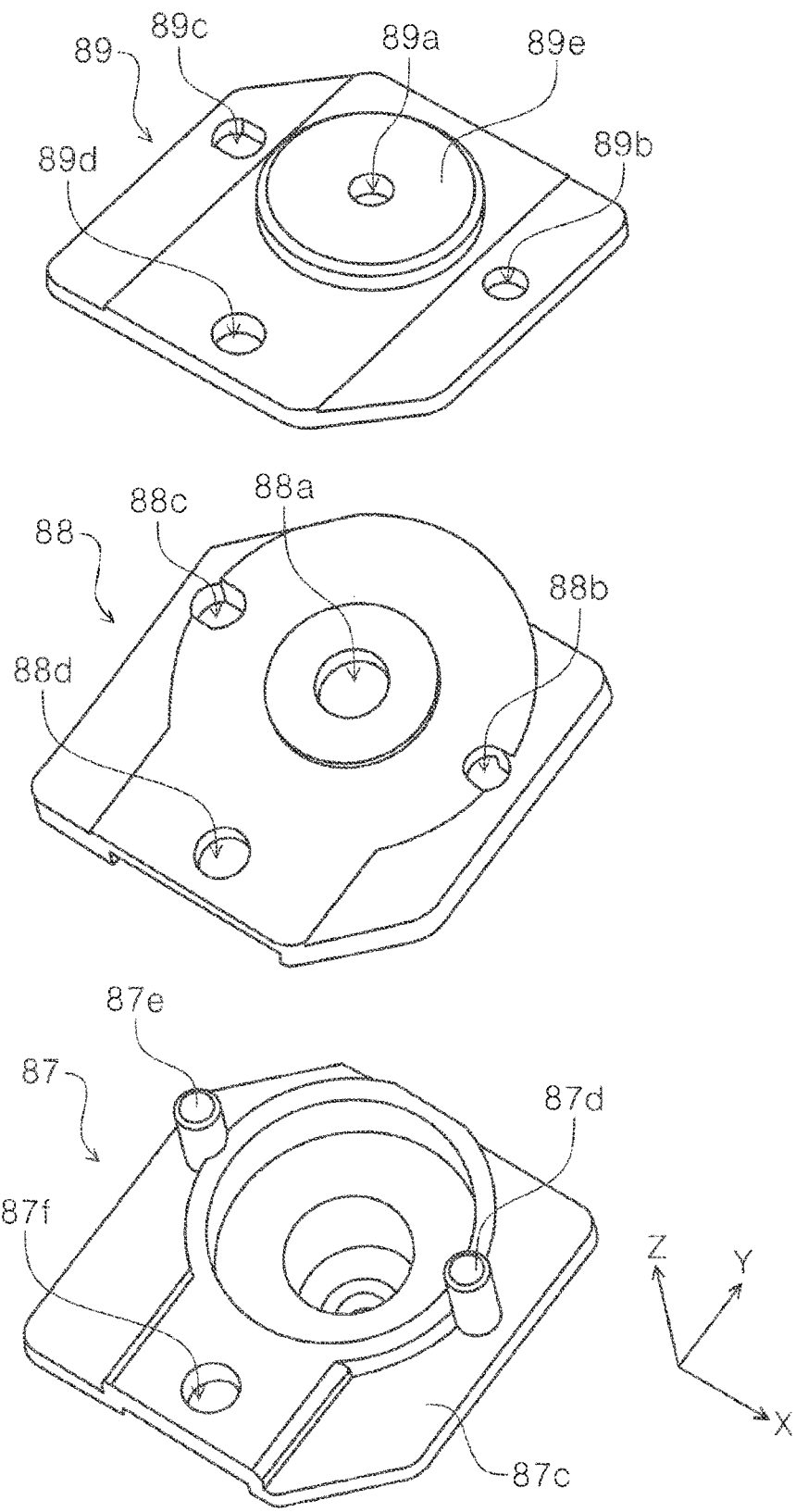
FIG. 19 is an exploded perspective view of the light condensing member, the intermediate member, and the reduction portion forming member.

These three members are positioned by a first protrusion 87d and a second protrusion 87e formed in the light condensing member 87 as illustrated in FIG. 18 and FIG. 19. The first protrusion 87d is inserted through a positioning hole 88b formed in the intermediate member 88 and is further inserted through a positioning hole 89b formed in the reduction portion forming member 89. The second protrusion 87e is inserted through a long hole 88c formed in the intermediate member 88 and is further inserted through a long hole 89c formed in the reduction portion forming member 89.

Here, the long holes 88c and 89c are long holes that are long in the X axis direction. Thus, a relative position among the three members in the X axis direction is defined by inserting the first protrusion 87d through the positioning hole 88b and the positioning hole 89b. The relative position among the three members in the Y axis direction is defined by the first protrusion 87d and the second protrusion 87e.

The first protrusion 87d fits in the positioning hole 103c (refer to FIG. 15 and FIG. 17) formed in the light reception portion substrate holding frame 103. Accordingly, positions of the three members and the light reception portion substrate holding frame 103 in the X axis direction and the Y axis direction are defined. The second protrusion 87e enters into the long hole 103d formed in the light reception portion substrate holding frame 103. The long hole 103d is a long hole that is long in the X axis direction. Thus, fitting between the second protrusion 87e and the long hole 103d defines the positions of the three members and the light reception portion substrate holding frame 103 in the Y axis direction.

As illustrated in FIG. 19, a screw insertion through-hole 89d is formed in the reduction portion forming member 89. A screw insertion through-hole 88d is formed in the intermediate member 88. A screw insertion through-hole 87f is formed in the light condensing member 87. By inserting the screw Z5 (refer to FIG. 27) through these screw insertion through-holes and the screw insertion through-hole 104g (refer to FIG. 29) formed in the light emission portion substrate holding frame 104 and fitting the screw Z5 in a screw hole 103e of the light reception portion substrate holding frame 103, the three members are fixed to the light reception portion substrate holding frame 103 together with the light emission portion substrate holding frame 104.

As illustrated in FIG. 18, in the light condensing member 87, a second base portion 87g having a circular disk shape is formed in a first base portion 87c. The second base portion 87g fits in the opening portion 104e (refer to FIG. 29) formed in the light emission portion substrate holding frame 104.

Next, as illustrated in FIG. 19, a projection portion 89e having a circular disk shape is formed in the reduction portion forming member 89. A reduction portion 89a is formed at a center of the projection portion 89e. The reduction portion 89a has a perfect circular shape in a view from the Z axis direction and functions as a reduction portion that reduces a quantity of light heading toward the optical filter 3 (incident light processing portion 2) by passing through the bandpass filter 7 as illustrated in FIG. 10. The light reception portion substrate holding frame 103 is a frame that is arranged to face the light reception portion substrate 80 and has a shape avoiding the optical filter 3 by including the substrate support portions 103f and 103g formed at positions slightly higher than the base portion 103a in the +Z direction. The light reception portion substrate holding frame 103 is one example of a frame to which the reduction portion forming member 89 and the light reception portion substrate 80 are fixed.

The projection portion 89e fits in the opening portion 103b (refer to FIG. 15 and FIG. 17) formed in the light reception portion substrate holding frame 103.

Figure 20:
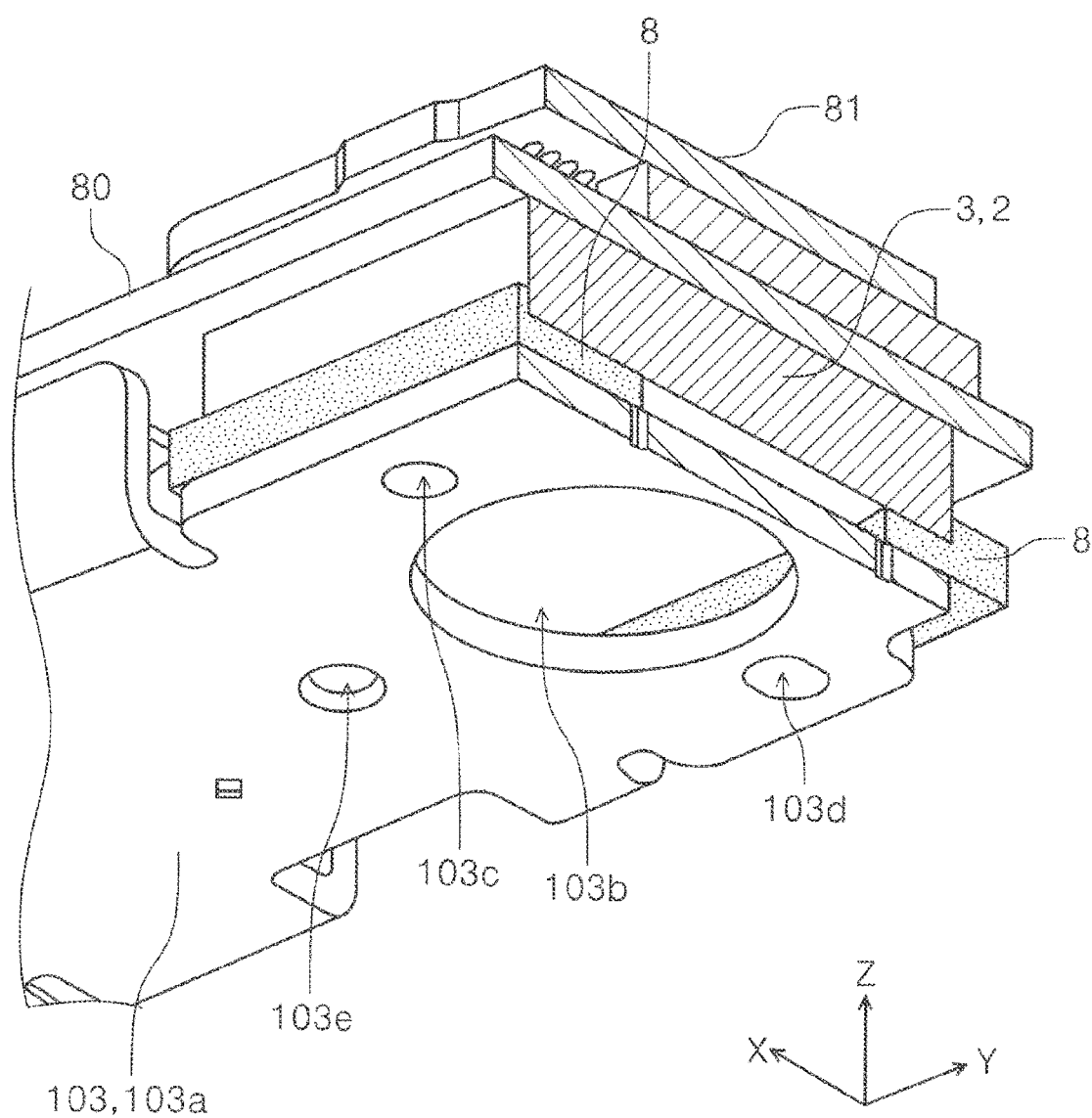
FIG. 20 is a cross-sectional perspective view of the light reception portion substrate, the light reception portion substrate holding frame, and the optical filter.
Figure 21:
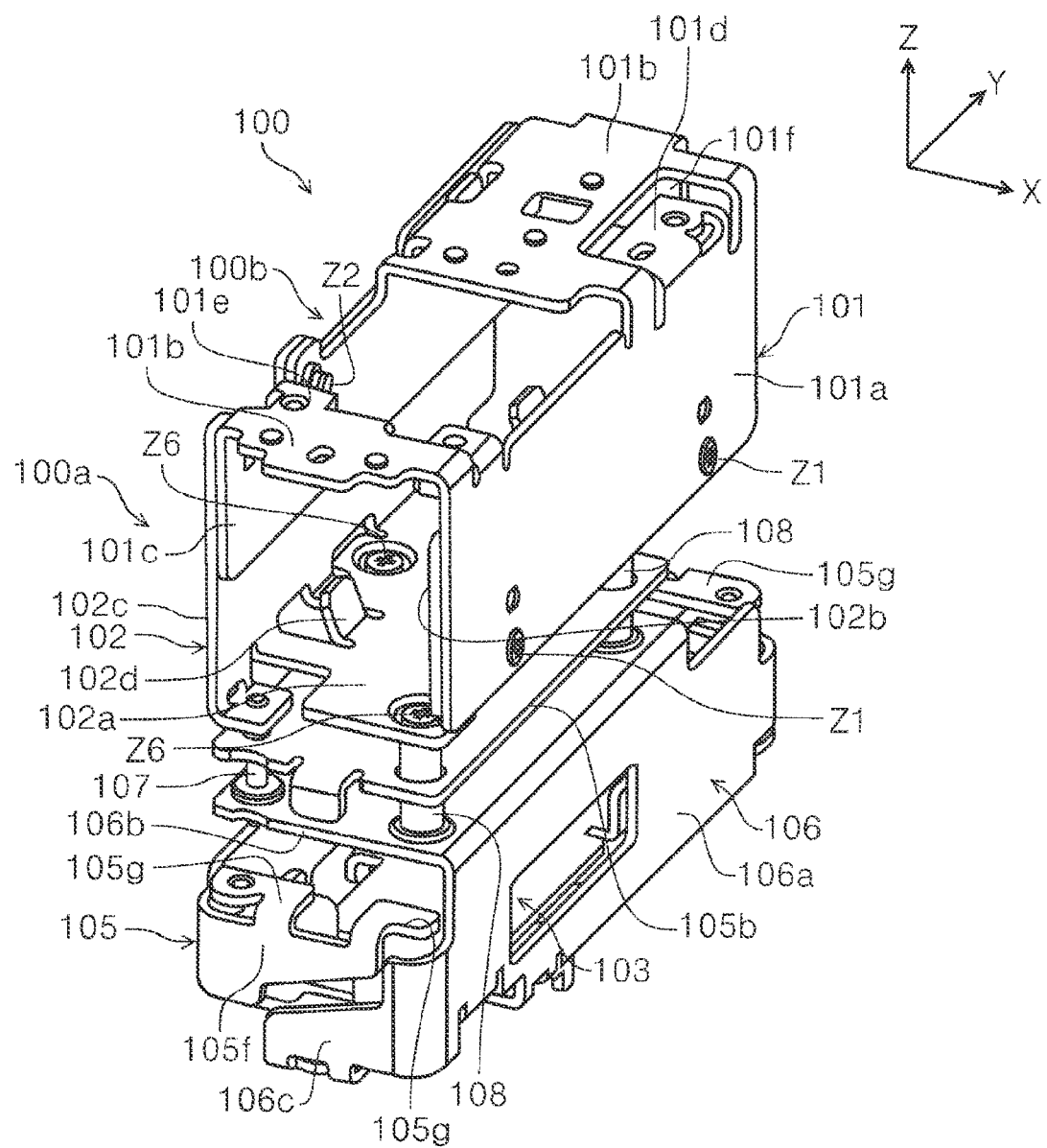
FIG. 21 is a perspective view of a frame assembly viewed from above.
Figure 22:
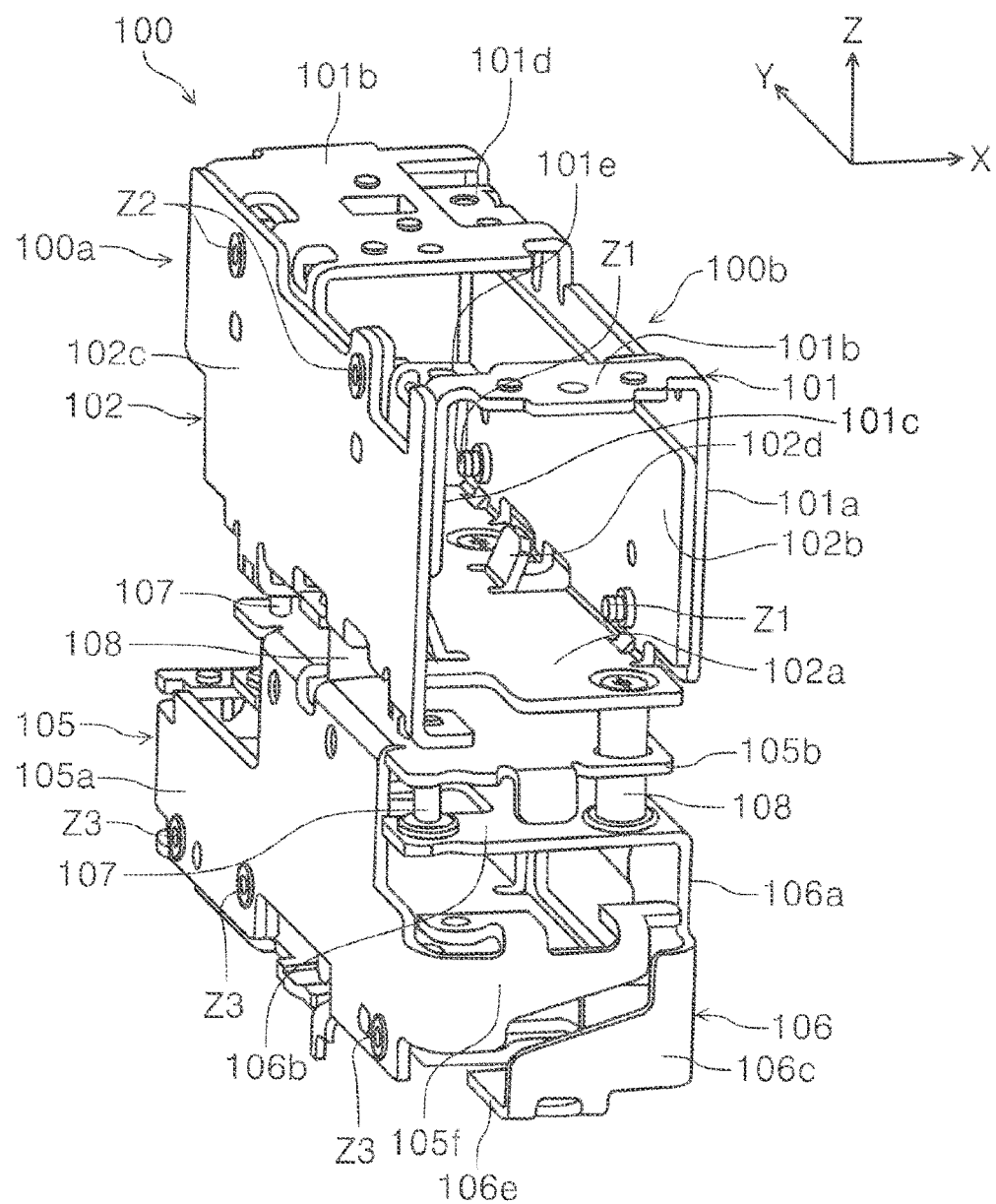
FIG. 22 is a perspective view of the frame assembly viewed from above.
Figure 23:
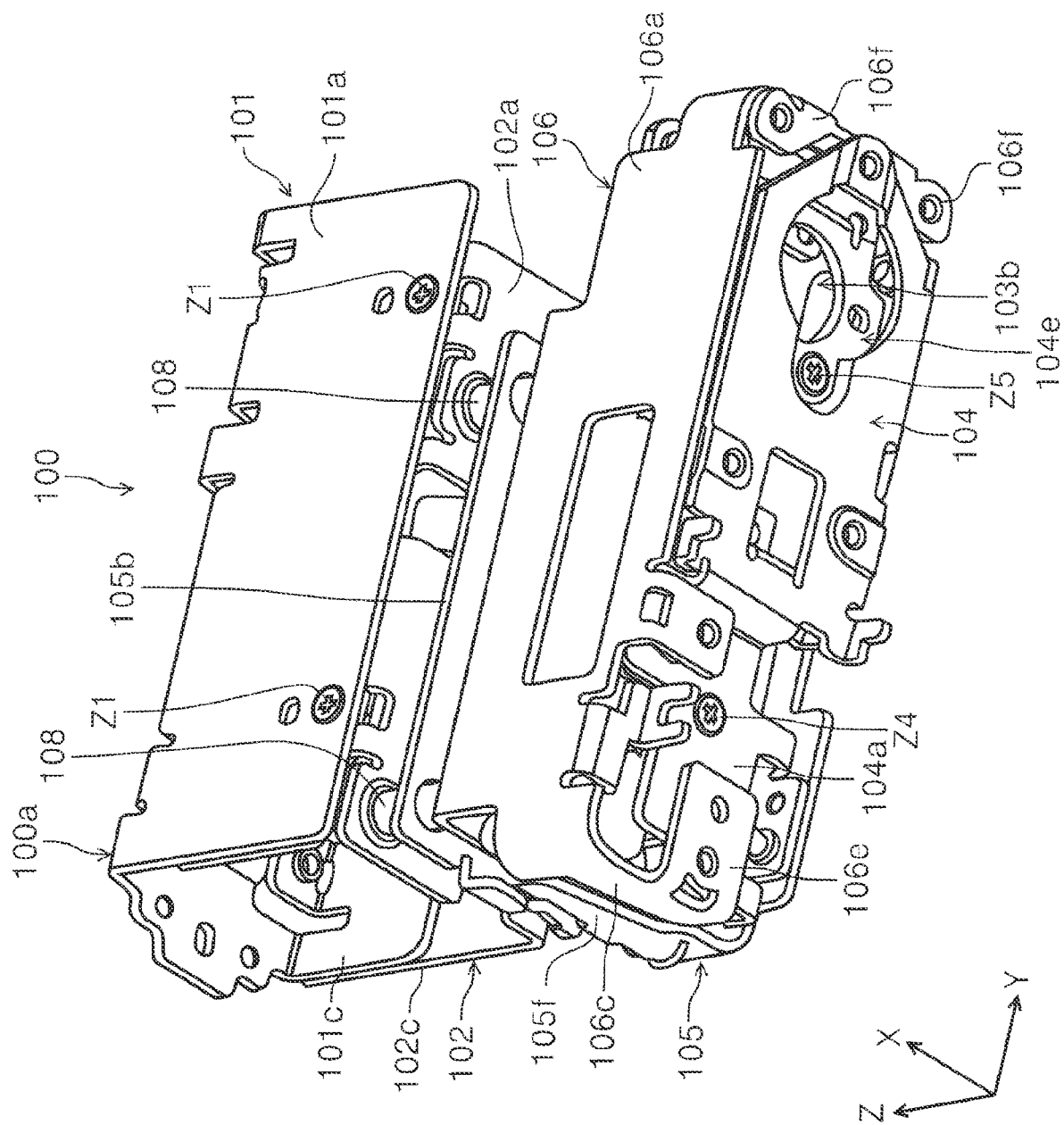
FIG. 23 is a perspective view of the frame assembly viewed from below.
Figure 24:
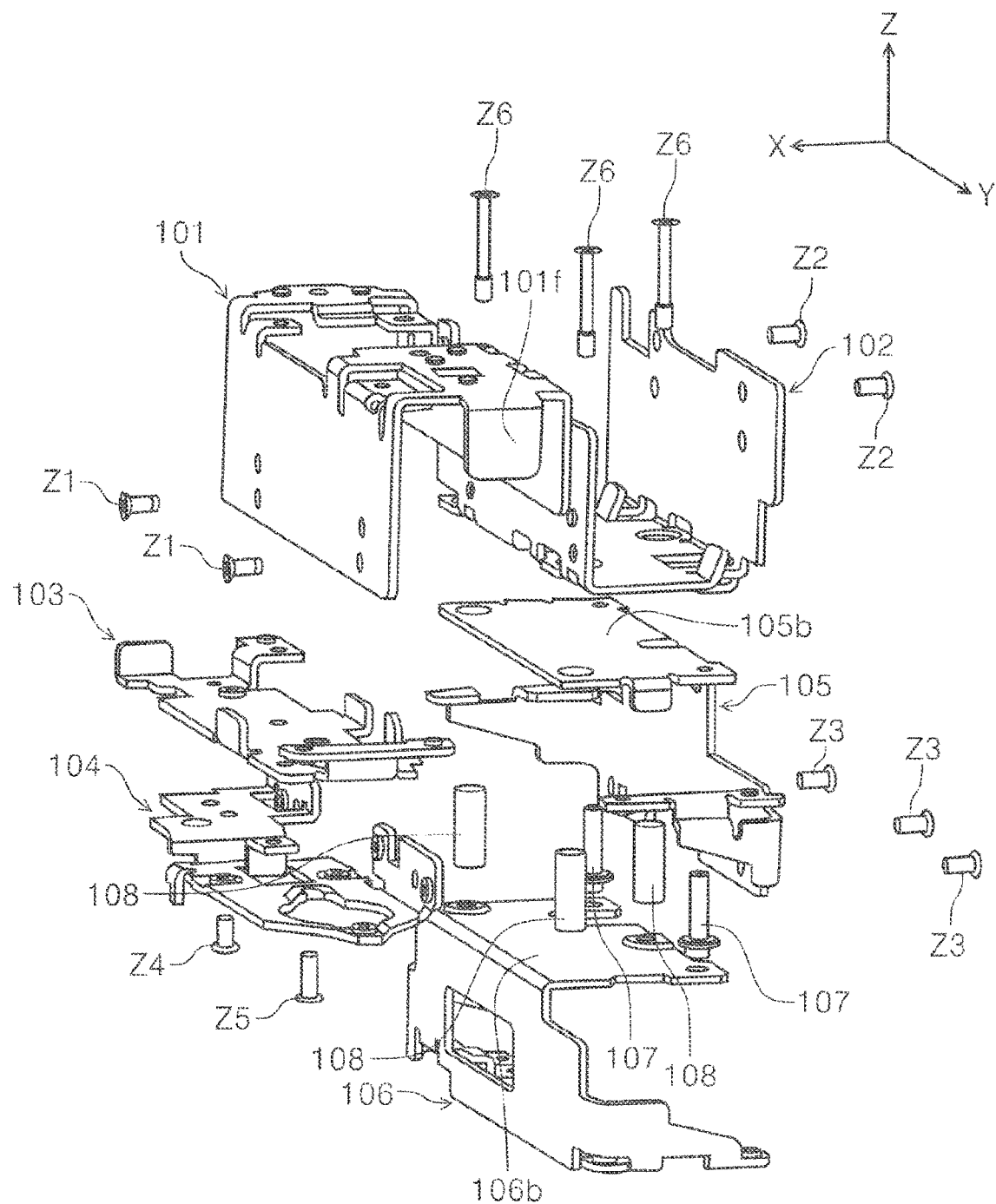
FIG. 24 is an exploded perspective view of the frame assembly.

Here, as illustrated in FIG. 20 and FIG. 10, a gap between the light reception portion substrate holding frame 103 and the optical filter 3 is filled with a plastic member 8. That is, since an external force when applied to the optical filter 3 in the Z axis direction adversely affects the color measurement result, it is necessary to form a gap between the light reception portion substrate holding frame 103 and the optical filter 3 such that the light reception portion substrate holding frame 103 does not come into contact with the optical filter 3. However, when an impact due to a fall or the like is received, there is a concern that a member constituting the optical filter 3 is peeled off in the Z axis direction. From such a viewpoint, it is considered that a gap is formed between the light reception portion substrate holding frame 103 and the optical filter 3, and an elastic material or the like is interposed in the gap. However, the elastic material applies an external force to the optical filter 3 at all times and thus, is not preferred.

From such a viewpoint, the gap between the light reception portion substrate holding frame 103 and the optical filter 3 is filled with the plastic member 8 in the present embodiment. Accordingly, normally an external force is unlikely to be applied to the optical filter 3. When an impact is exerted, the optical filter 3 can be supported by the plastic member 8, and peeling of the member constituting the optical filter 3 can be suppressed.

For example, acrylic gel can be used as the plastic member 8.

Next, the movable unit 1e configured in the above manner is configured such that the guided portion 105b of the movable frame 105 enters between the first unit 1c and the second unit 1d constituting the fixed unit 1b as illustrated in FIG. 8. In a state where the guided portion 105b enters between the first unit 1c and the second unit 1d, the pipes 108 pass through the pipe insertion through-holes 105c (refer to FIG. 12 and FIG. 26) formed in the guided portion 105b. In addition, the guide shafts 107 pass through guided holes 105d and 105e (refer to FIG. 12 and FIG. 26) formed in the guided portion 105b.

Accordingly, the movable frame 105, that is, the movable unit 1e, can be displaced in the Z axis direction with respect to the fixed unit 1b.

The pipe insertion through-holes 105c are formed to have inner diameters greater than outer diameters of the pipes 108. Accordingly, it is configured that contact between the pipes 108 and the pipe insertion through-holes 105c does not cause significant resistance to displacement of the movable unit 1e.

In addition, the guided hole 105e is formed into an elliptical shape that is slightly long in the Y axis direction unlike the guided hole 105d. Accordingly, a position of the movable unit 1e in the Y axis direction with respect to the fixed unit 1b is defined by fitting between the guided hole 105d and the guide shaft 107.

The position of the movable unit 1e in the X axis direction with respect to the fixed unit 1b is defined by insertion of the guide shaft 107 through the guided hole 105d and insertion of the guide shaft 107 through the guided hole 105e.

As illustrated in FIG. 9 and FIG. 31, elastic members 95 are disposed between the guided portion 105b and the first unit 1c and between the guided portion 105b and the second unit 1d. In an assembled state, the elastic members 95 are disposed in a state where free lengths thereof are reduced. The elastic members 95 exhibit a pressing force between the guided portion 105b and the first unit 1c and exhibit a pressing force between the guided portion 105b and the second unit 1d. Accordingly, the position of the movable unit 1e in the Z axis direction with respect to the fixed unit 1b is held. When an impact in the Z axis direction is exerted on the apparatus internal unit 1a, the impact applied to the movable unit 1e is attenuated by elasticity of the elastic members 95.

For example, polyurethane foam can be used as the elastic members 95.

Thicknesses in the Z axis direction, hardness, and areas in the X-Y plane of the elastic members 95 are preferably selected such that gaps in which the elastic members 95 are not interposed do not occur between the guided portion 105b and the first unit 1c and between the guided portion 105b and the second unit 1d when a vibration or an impact is exerted on the apparatus internal unit 1a or in a state where the apparatus internal unit 1a is left for a long period.

Coupling Structure Between Apparatus Internal Unit and Casing

Next, a coupling structure between the apparatus internal unit 1a and the casing will be described.

Figure 32:
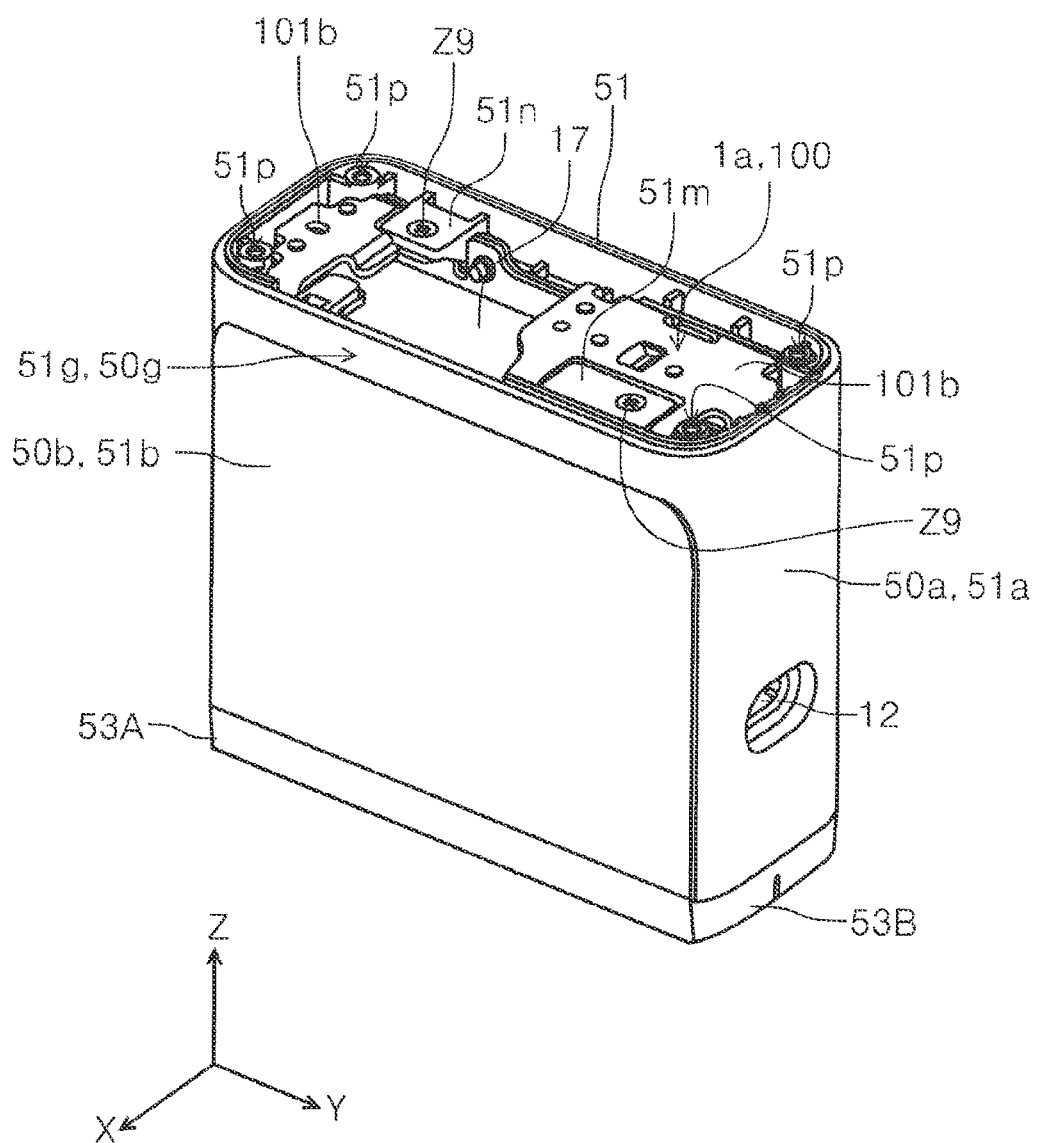
FIG. 32 is a perspective view illustrating coupled parts of a main casing and the frame assembly.

As illustrated in FIG. 32, unit fixing portions 51m and 51n having surfaces parallel to the X-Y plane are disposed inside an upper portion of the main casing 51. A contact portion 101d (refer to FIG. 7) formed in the first battery holding frame 101 is fixed to the unit fixing portion 51m by a screw Z9. The contact portion 101d has a surface parallel to the X-Y plane and is in surface contact with the unit fixing portion 51m.

Similarly, a contact portion 101e (refer to FIG. 7) formed in the first battery holding frame 101 is fixed to the unit fixing portion 51n by the screw Z9. The contact portion 101e has a surface parallel to the X-Y plane and is in surface contact with the unit fixing portion 51n.

As described above, the apparatus internal unit 1a is coupled to the main casing 51 such that the apparatus internal unit 1a is held in the upper portion of the main casing 51.

The upper casing 52 (refer to FIG. 3) constituting a periphery of the operation portion 14 and the display portion 15 in an upper portion of the color measurement apparatus 1 is fixed to the main casing 51 by screws Z15 (refer to FIG. 11) that fit in screw holes 51p formed at four corners of the upper portion of the main casing 51.

In addition, as described above, the opening portion forming member 21 (refer to FIG. 5 and FIG. 9) constituting the bottom portion of the color measurement apparatus 1 is fixed by screws to the coupling portions 106f and 106e (refer to FIG. 23) of the bottom frame 106 disposed in a bottom portion of the apparatus internal unit 1a. In addition, the bottom first casing 53A constituting a periphery of the bottom portion of the color measurement apparatus 1 is fixed by screws to the bottom frame 106 by the screw Z14 and the like illustrated in FIG. 9. The bottom second casing 53B is fixed to the bottom frame 106 together with the opening portion forming member 21 by the screw Z13 illustrated in FIG. 9.

In an assembled state of each casing, in parts denoted by reference sign B1 in FIG. 9, that is, in coupled parts of the main casing 51 and the upper casing 52, the main casing 51 and the upper casing 52 are configured to alternately overlap in a direction from the outside of the apparatus toward the inside of the apparatus (refer to FIG. 11 as well). Similarly, parts denoted by reference sign B2, that is, coupled parts of the main casing 51 and the bottom first casing 53A and coupled parts of the main casing 51 and the bottom second casing 53B, are configured to alternately overlap in the direction from the outside of the apparatus toward the inside of the apparatus. Accordingly, entrance of dust or the like or light inside the apparatus from outside the apparatus can be suppressed.

In addition, in the main casing 51, an opening is formed at an arrangement position of the wired IF 12, and there is a concern that dust or the like or light enters inside the apparatus from outside the apparatus. However, a cover member 27 is disposed at the arrangement position of the wired IF 12, and the cover member 27 suppresses entrance of dust or the like or light inside the apparatus.

Characteristic Configurations and Effects of Color Measurement Apparatus

Hereinafter, characteristic configurations and effects of the color measurement apparatus 1 configured in the above manner will be described.

First, FIG. 7 will be mainly referred to for description. The apparatus internal unit 1a is a unit including the incident light processing portion 2 and the fixed unit 1b coupled to the main casing 51 and the opening portion forming member 21. The apparatus internal unit 1a includes the movable unit 1e that is displaceable in the Z axis direction with respect to the fixed unit 1b along the optical axis of light heading toward the incident light processing portion 2 from the opening portion 21a, and at least one elastic member 95 (refer to FIG. 9 and FIG. 31) that holds the position of the movable unit 1e in the Z axis direction with respect to the fixed unit 1b by elasticity. The elastic members 95 are configured to attenuate an impact on the movable unit 1e in the Z axis direction. Accordingly, a shift in position between the opening portion 21a and the incident light processing portion 2 in the direction intersecting with the Z axis direction is unlikely to occur, and an appropriate color measurement result can be obtained while an impact attenuation structure for attenuating an impact applied to the incident light processing portion 2 is employed.

In addition, since the impact attenuation structure in the Z axis direction is employed, an increase in size and cost of the apparatus can be suppressed, compared to a configuration in which the impact attenuation structure is also disposed in a direction of high endurance against impact. In the present embodiment, the direction of high endurance against impact is the direction intersecting with the Z axis direction.

Furthermore, the entire weight of the apparatus internal unit 1a is not applied to the impact attenuation structure, that is, the elastic members 95, and only a weight of the movable unit 1e is applied to the elastic members 95. Thus, an increase in size and cost of the elastic members 95 can also be suppressed, and an increase in size and cost of the apparatus can also be suppressed.

For example, it may be configured that only the lower elastic member 95 is disposed by removing an interval between the guided portion 105b and the movable unit 1e, that is, by omitting the upper elastic member 95 illustrated in FIG. 9 and FIG. 31. Accordingly, an impact applied to the movable unit 1e in the Z axis direction when the apparatus falls with the bottom surface 50f facing downward can be suppressed.

In addition, the fixed unit 1b includes the first unit 1c coupled to the opening portion forming member 21, the second unit 1d that is positioned on the side of the first unit 1c away from the opening portion forming member 21 in the Z axis direction and is coupled to the first unit 1c in a state of having an interval with the first unit 1c in the Z axis direction, and the guide shafts 107 disposed to extend in the Z axis direction between the first unit 1c and the second unit 1d. The movable unit 1e includes the guided portion 105b that is interposed between the first unit 1c and the second unit 1d and is guided by the guide shafts 107. Accordingly, an apparatus in which the movable unit 1e can be displaced in the Z axis direction can be obtained with a simple structure at a low cost.

In addition, the elastic members 95 are disposed between the first unit 1c and the guided portion 105b and between the second unit 1d and the guided portion 105b in a state where the free lengths thereof in the Z axis direction are reduced. Accordingly, since the elastic members 95 are in a compressed state at all times, the position of the movable unit 1e in the Z axis direction is stable, and installation positions of the elastic members 95 are unlikely to shift in the direction intersecting with the Z axis direction.

Figure 30:
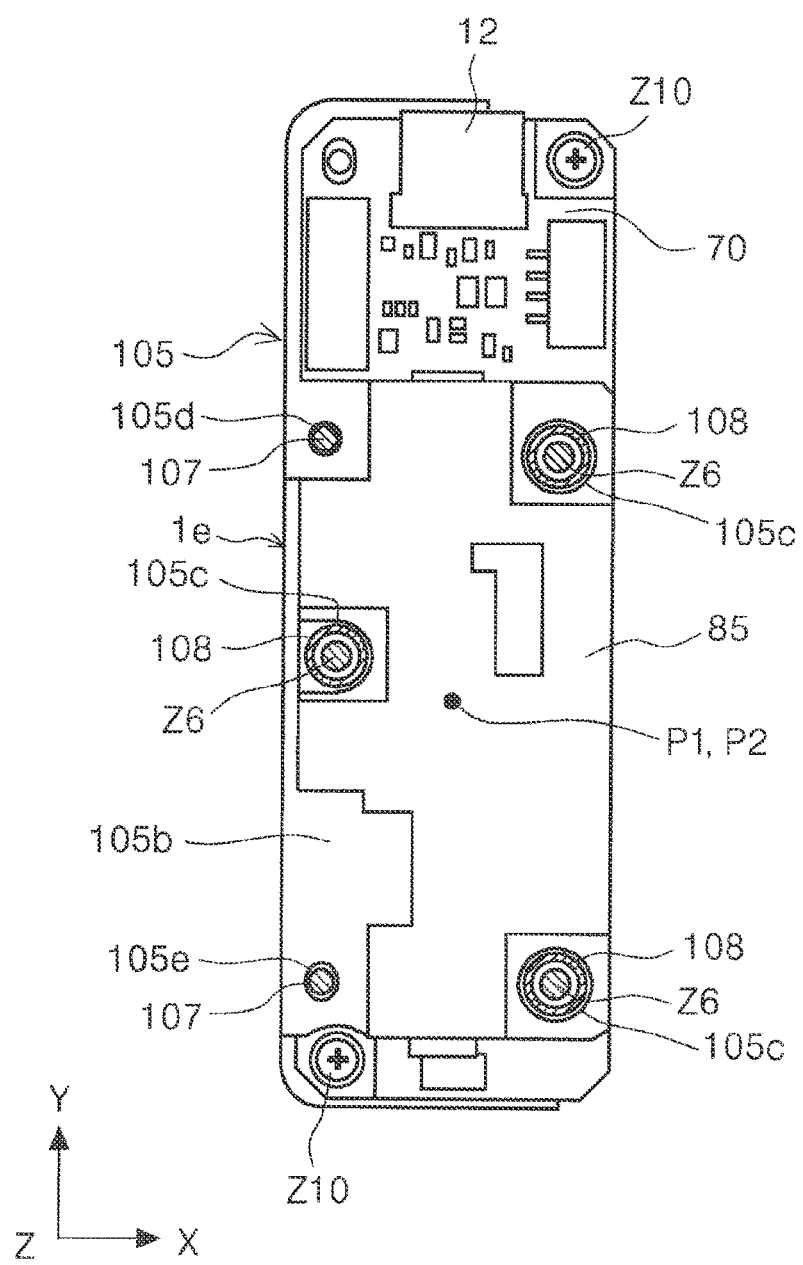
FIG. 30 is a plan view of the movable unit and an elastic member.

In addition, as illustrated in FIG. 30, centroid positions P2 of the elastic members 95 when viewed from the Z axis direction are positions corresponding to a centroid position P1 of the movable unit 1e. Accordingly, when the movable unit 1e is displaced in the Z axis direction against the elasticity of the elastic members 95, a force in the direction intersecting with the Z axis direction is unlikely to occur on the movable unit 1e. Accordingly, the movable unit 1e can be smoothly displaced in the Z axis direction.

When the centroid positions P2 of the elastic members 95 are positions corresponding to the centroid position P1 of the movable unit 1e, this is not limited to when the centroid positions P2 completely coincide with the centroid position P1 in a view from the Z axis direction, and means that a slight shift may occur to an extent in which the above effects may be achieved.

In addition, as illustrated in FIG. 7, the battery 17 that is a power supply source of the apparatus is disposed in the fixed unit 1b. Thus, a weight of the battery 17 that is a heavy object is not applied to the elastic members 95, that is, the impact attenuation structure. Accordingly, an increase in size or cost of the elastic members 95 can be suppressed, and an increase in size and cost of the apparatus can also be suppressed.

In addition, as illustrated in FIG. 9, the light emission portion substrate 85, the light reception portion substrate 80, the battery control substrate 70, and the panel substrate 65 are arranged in an overlapping manner in order from the opening portion forming member 21 toward the display portion 15 in the Z axis direction. Thus, an apparatus dimension in the direction intersecting with the Z axis direction can be suppressed.

A configuration in which the apparatus internal unit 1a is configured with the fixed unit 1b and the movable unit 1e, and the position of the movable unit 1e with respect to the fixed unit 1b is held by the elasticity of the elastic members 95 can also be employed in other electronic apparatuses. Such an electronic apparatus includes a casing that forms an outer shell of the apparatus, and an apparatus internal unit disposed inside the casing. The apparatus internal unit includes a fixed unit coupled to the casing, a movable unit that can be displaced in a predetermined direction with respect to the fixed unit, and at least one elastic member that holds a position of the movable unit in the predetermined direction with respect to the fixed unit by elasticity.

Next, as illustrated in FIG. 15 and FIG. 16, the light reception portion substrate holding frame 103 is a frame that is arranged to face the light reception portion substrate 80 and has a shape avoiding the optical filter 3. The reduction portion forming member 89, that is, the reduction portion 89a, is positioned in the light reception portion substrate holding frame 103.

Here, a relative position between the opening portion 32a (refer to FIG. 2) of the optical filter 3 and the reduction portion 89a in the X-Y plane is accurately decided when the optical filter 3 can be directly disposed in the light reception portion substrate holding frame 103. However, the optical filter 3 is a constituent that is mounted on a substrate, and cannot be directly disposed in the light reception portion substrate holding frame 103.

However, in the present embodiment, the relative position between the light reception portion substrate holding frame 103 and the light reception portion substrate 80 including the optical filter 3 in a direction intersecting with a center axis (optical axis CL) of the reduction portion 89a, that is, the direction intersecting with the Z axis direction, is decided by the positioning section 90.

Such a configuration defines a position of the reduction portion 89a with respect to the light reception portion substrate holding frame 103 and also defines a position of the light reception portion substrate 80 including the optical filter 3. Accordingly, even in a configuration in which the optical filter 3 is not directly disposed in the light reception portion substrate holding frame 103, a shift in position between the reduction portion 89a and the opening portion 32a (refer to FIG. 2) of the optical filter 3 in the X-Y plane can be suppressed, and an appropriate color measurement result can be obtained.

In the present embodiment, it is configured that the reduction portion 89a is formed in the reduction portion forming member 89, and the reduction portion forming member 89 is positioned with respect to the light reception portion substrate holding frame 103. Alternatively, for example, it may be configured that an opening portion is formed in the light reception portion substrate holding frame 103, and the opening portion functions as a reduction portion. In this case, particularly, suppressing reflection of light by performing black alumite treatment on the light reception portion substrate holding frame 103 is preferred from a viewpoint of securing color measurement accuracy.

In addition, as in the present embodiment, in a configuration in which the reduction portion 89a is formed in the reduction portion forming member 89, and the reduction portion forming member 89 is positioned with respect to the light reception portion substrate holding frame 103, forming the reduction portion forming member 89 of a black resin material and omitting the alumite treatment on the light reception portion substrate holding frame 103 can suppress an increase in cost of the apparatus while securing the color measurement accuracy.

Other materials can also be appropriately used as the materials of the light reception portion substrate holding frame 103 and the reduction portion forming member 89.

In addition, the color measurement apparatus 1 has a longitudinal direction, that is, the Y axis direction, and a short direction, that is, the X axis direction, in a view from the Z axis direction. The light reception portion substrate 80 has a shape extending in the longitudinal direction. In the light reception portion substrate 80, the optical filter 3 is arranged at a position shifted to one side in the +Y direction from a center position Yc (refer to FIG. 14) of the light reception portion substrate 80 in the longitudinal direction. The positioning section 90 decides the relative position between the light reception portion substrate 80 and the light reception portion substrate holding frame 103 in the Y axis direction in one location (the positioning hole 80a and the projection portion 103h) in the +Y direction from the center position Yc. Accordingly, a positional relationship between the light reception portion substrate 80 and the light reception portion substrate holding frame 103 having a shape extending in the longitudinal direction is decided at a position close to the optical filter 3, and a shift in position between the reduction portion 89a and the optical filter 3 can be appropriately suppressed.

In addition, in the present embodiment, the positioning section 90 is configured to include protrusions (the projection portion 103h and the projection portion 103j) disposed in one of the light reception portion substrate 80 and the light reception portion substrate holding frame 103 and fitting holes (the positioning hole 80a and the long hole 80d) that are disposed in the other of the light reception portion substrate 80 and the light reception portion substrate holding frame 103 and in which the protrusions fit. Specifically, in the present embodiment, the positioning section 90 includes the positioning hole 80a and the projection portion 103h fitting in the positioning hole 80a, and the long hole 80d and the projection portion 103h fitting in the long hole 80d.

Accordingly, the positioning section 90 can be configured at a low cost.

In the present embodiment, the fitting holes are disposed in the light reception portion substrate 80, and the protrusions are disposed in the light reception portion substrate holding frame 103. Conversely, the protrusions may be disposed in the light reception portion substrate 80, and the fitting holes may be disposed in the light reception portion substrate holding frame 103.

In addition, in the present embodiment, the light condensing member 87 that is a cylindrical member forming a passage of light heading toward the reduction portion 89a from the measurement target 200 is disposed in the light reception portion substrate holding frame 103. In other words, the light condensing member 87 is positioned in the light reception portion substrate holding frame 103. Accordingly, a relative position between the light condensing member 87 and the reduction portion 89a in the X-Y plane is appropriately decided.

In addition, in the present embodiment, the light reception portion substrate holding frame 103 is formed of aluminum, and the black alumite treatment is performed on a surface of the light reception portion substrate holding frame 103. Accordingly, a decrease in color measurement accuracy due to reflection of light on the light reception portion substrate holding frame 103 can be suppressed.

Next, in FIG. 3, the color measurement apparatus 1 includes the apparatus internal unit 1a including the incident light processing portion 2, and the main casing 51 that covers the apparatus internal unit 1a and forms the outer shell of the apparatus. The frame assembly 100 constituting the base body of the apparatus internal unit 1a is formed with the plurality of frames formed of aluminum, and the main casing 51 is formed of aluminum, and the alumite treatment is performed on the main casing 51.

In such a manner, since the frame assembly 100 and the main casing 51 are formed of aluminum, favorable heat dissipation is achieved. Since the alumite treatment is performed on the main casing 51, heat dissipation by radiation can be improved. With the above configuration, heat generated inside the apparatus can be favorably radiated outside the apparatus, and an appropriate color measurement result can also be obtained.

In the present embodiment, the alumite treatment of the main casing 51 is the black alumite treatment. However, the present disclosure is not limited thereto.

In addition, in the present embodiment, while the upper casing 52, the bottom first casing 53A, and the bottom second casing 53B are formed of a resin material, these casings may be formed of aluminum. In addition, at this point, the black alumite treatment or alumite treatment of other colors may be performed.

In addition, the frame assembly 100 includes the contact portions 101d and 101e (refer to FIG. 7) that are in contact with the main casing 51 inside the main casing 51. Accordingly, heat can be efficiently transferred to the main casing 51 from the frame assembly 100.

In addition, in the present embodiment, the black alumite treatment is performed on the plurality of frames constituting the frame assembly 100 in the same manner as the main casing 51. Thus, heat dissipation of the frame assembly 100 by radiation can be improved, and heat generated inside the apparatus can be more favorably radiated outside the apparatus. Even in this case, alumite treatment of other colors may be performed instead of the black alumite treatment.

Alternatively, the alumite treatment of the plurality of frames constituting the frame assembly 100 can be omitted.

In addition, the main casing 51 has a longitudinal direction (Y axis direction) and a short direction (X axis direction) in a top view and includes the recessed portions 51g for a grip on side walls in the short direction (refer to FIG. 31). Accordingly, handleability of the apparatus is improved. In addition, surface areas of the side walls of the main casing 51 are increased, and heat dissipation is improved.

In addition, as illustrated in FIG. 7, the frame assembly 100 includes the battery holding portion 100a having a shape that surrounds the battery 17. Accordingly, heat generated from the battery 17 is effectively transferred to the battery holding portion 100a and is favorably radiated outside the apparatus.

In addition, the frame assembly 100 includes the movable frame 105 as a substrate holding portion that holds the light reception portion substrate 80 in which the incident light processing portion 2 is disposed. The battery holding portion 100a and the movable frame 105 are arranged at an interval in the Z axis direction.

That is, both of the battery 17 and the light reception portion substrate 80 are heat generation sources, and when both are disposed at close positions, there is a concern that efficient heat dissipation is not performed. However, as described above, since the battery holding portion 100a and the movable frame 105 are arranged at an interval in the Z axis direction, efficient heat dissipation can be performed.

In the present embodiment, the frame fixing portion 105a of the movable frame 105 constituting the movable unit 1e is displaced in the Z axis direction while being in contact with a contact portion, not illustrated, formed inside the main casing 51. Accordingly, heat of the movable frame 105, that is, the movable unit 1e, is transferred to the main casing 51 and is favorably radiated outside the apparatus through the main casing 51.

Next, as described with reference to FIG. 31, the first corner portion C1 in which the first wall portion W1 intersects with the third wall portion W3, the second corner portion C2 in which the first wall portion W1 intersects with the fourth wall portion W4, the third corner portion C3 in which the second wall portion W2 intersects with the fourth wall portion W4, and the fourth corner portion C4 in which the second wall portion W2 intersects with the third wall portion W3 are formed inside the battery holding portion 100a.

An upper portion of the battery 17 is formed into an arc shape when cut along the X-Z plane. In addition, a lower portion of the battery 17 has a shape of which a width is decreased toward the first wall portion W1 such that an interval with the third wall portion W3 and an interval with the fourth wall portion W4 are increased. Accordingly, a state where a gap S1 is formed between the first corner portion C1 and the battery 17, a gap S2 is formed between the second corner portion C2 and the battery 17, a gap S3 is formed between the third corner portion C3 and the battery 17, and a gap S4 is formed between the fourth corner portion C4 and the battery 17 is achieved.

In the present embodiment, the screw Z1 for assembling the first battery holding frame 101 and the second battery holding frame 102 constituting the battery holding portion 100a is arranged using the gap S2.

In addition, the screws Z9 for assembling the main casing 51 and the horizontal portion 101b of the first battery holding frame 101 are arranged using the gaps S3 and S4.

As described above, since screws related to the battery holding portion 100a are arranged using gaps formed inside the battery holding portion 100a, an increase in size of the apparatus due to constituents related to the battery holding portion 100a can be suppressed.

In the present embodiment, while the constituents related to the battery holding portion 100a are arranged using the gaps S2, S3, and S4, at least one of the gaps S1, S2, S3, and S4 may be used.

In addition, as described above, the lower portion of the battery 17 has a shape of which the width is decreased toward the first wall portion W1 such that the interval with the third wall portion W3 and the interval with the fourth wall portion W4 are increased. Thus, the gaps S1 and S2 can be increased. Since the screw Z1 is arranged using the gap S2 formed in such a manner, an increase in size of the apparatus due to the constituents related to the battery holding portion 100a can be further suppressed.

Figure 33:
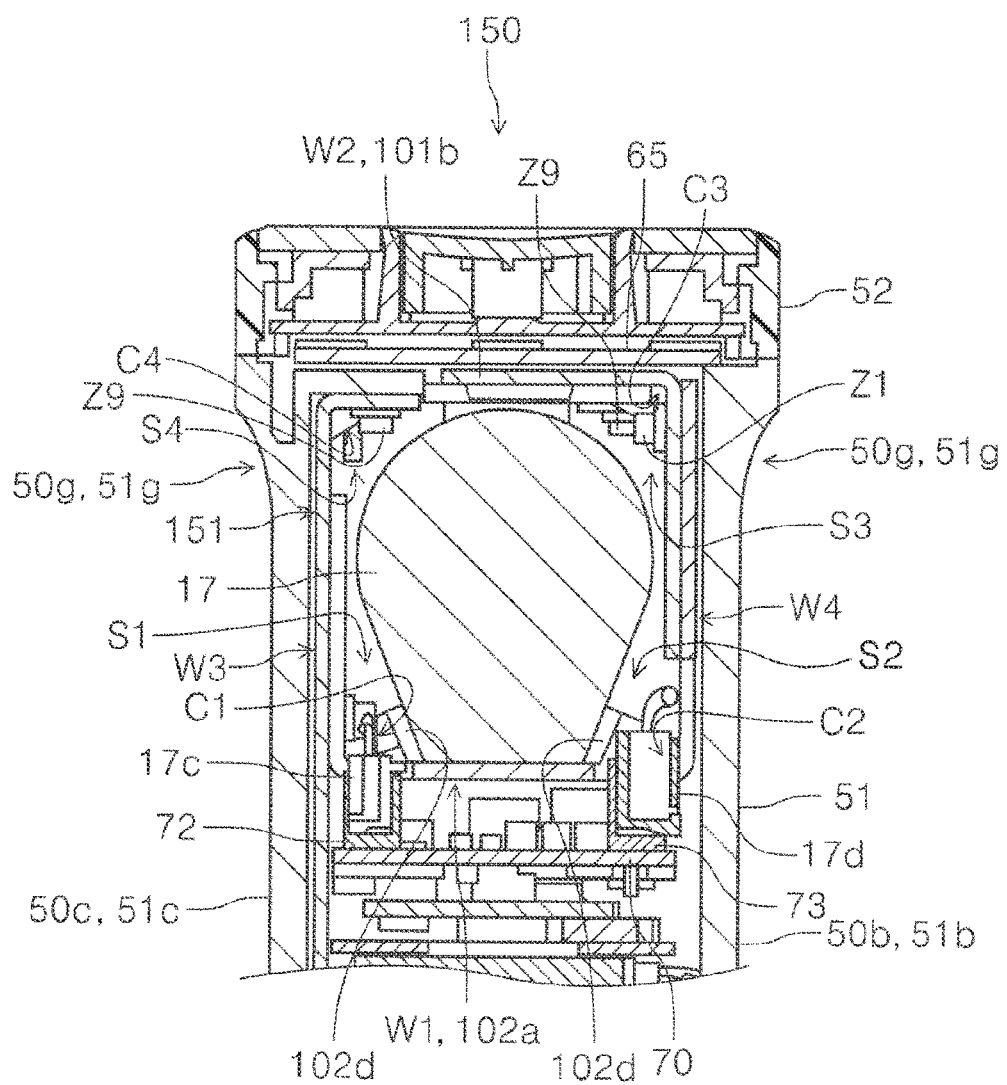
FIG. 33 is a cross-sectional view of a battery holding portion according to another embodiment.

The constituents related to the battery holding portion 100a are not limited to the screws and may be other constituents, for example, connectors to which the battery 17 is coupled. FIG. 33 illustrates a color measurement apparatus 150 according to another embodiment. The same configurations as the configurations already described are designated by the same reference signs. Inside a battery holding portion 151 in the color measurement apparatus 150 illustrated in FIG. 33, the screw Z1 is arranged using the gap S3, and the screws Z9 are arranged using the gap S4.

In the present embodiment, the battery control substrate 70 is arranged at a position close to the battery holding portion 151. Accordingly, the first connector 17c coupled to the first battery connector 72 enters into the gap S1, that is, is arranged using the gap S1. In addition, similarly, the second connector 17d coupled to the second battery connector 73 enters into the gap S2, that is, is arranged using the gap S2. Such a configuration can suppress an increase in size of the apparatus.

While the first battery connector 72 and the second battery connector 73 do not enter into the gaps S1 and S2, respectively, in the configuration illustrated in FIG. 33, the first battery connector 72 and the second battery connector 73 may be configured to enter into the gaps S1 and S2.

In addition, a configuration that is arranged using at least one of the gaps S1, S2, S3, and S4 may be any one, any two, or all of the connectors to which the battery 17 is coupled, screws for assembling a plurality of frames constituting the battery holding portion 100a, and screws for assembling the main casing 51 and the battery holding portion 100a.

In addition, a configuration that is arranged for one gap may be any one, any two, or all of the connectors to which the battery 17 is coupled, the screws for assembling the plurality of frames constituting the battery holding portion 100a, and the screws for assembling the main casing 51 and the battery holding portion 100a.

The present disclosure is not limited to each embodiment described above, and various modifications can be made within the scope of the disclosure disclosed in the claims. Such modifications also fall within the scope of the present disclosure.

For example, while the color measurement apparatus 1 incorporates the battery 17 in the embodiment, the battery 17 may be configured to be detachable. That is, the color measurement apparatus 1 may be configured to not incorporate the battery 17. In addition, in this case, the battery 17 may be a primary battery that is not repeatedly charged and discharged.

In addition, in the present embodiment, the incident light processing portion 2 is configured to include the optical filter 3 and the light reception portion 4, and the optical filter 3 is a variable wavelength Fabry-Perot etalon that transmits a predetermined wavelength component of the incident light. However, the present disclosure is not limited thereto. For example, a spectroscopic method that uses a diffraction lattice may be used as a spectroscopic method. In addition, an apparatus configuration that employs a stimulus value direct reading method of directly measuring three stimulus values of base colors as a color measurement principle may be available.

In addition, while the LED is used as the light emission element used in the light emission portion 9 in the present embodiment, the present disclosure is not limited thereto. For example, a xenon lamp may be used.

What is claimed is:

1. A color measurement apparatus comprising:
    an opening portion to allow light arriving from a measurement target to enter inside the apparatus;
    an incident light processing portion that processes light incident inside the apparatus through the opening portion;
    an opening portion forming member that is arranged on a bottom surface side of the apparatus and in which the opening portion is formed; and
    an apparatus internal unit including the incident light processing portion, wherein
    the apparatus internal unit includes
        a fixed unit coupled to the opening portion forming member,
        a movable unit that is a unit including the incident light processing portion and is configured to be displaced with respect to the fixed unit in a first direction along an optical axis of light heading toward the incident light processing portion from the opening portion, and
        at least one elastic member that holds a position of the movable unit in the first direction with respect to the fixed unit by elasticity.

2. The color measurement apparatus according to claim 1, wherein
    the fixed unit includes
        a first unit coupled to the opening portion forming member,
        a second unit that is positioned on a side away from the opening portion forming member with respect to the first unit in the first direction and is coupled to the first unit in a state of having an interval with the first unit in the first direction, and
        a guide shaft disposed to extend in the first direction in the interval between the first unit and the second unit, and
    the movable unit includes a guided portion that is interposed between the first unit and the second unit and is guided by the guide shaft.

3. The color measurement apparatus according to claim 2, wherein
    the elastic member is disposed between the first unit and the guided portion and between the second unit and the guided portion in a state where a free length in the first direction is reduced.

4. The color measurement apparatus according to claim 3, wherein
    a centroid position of the elastic member when viewed from the first direction is a position corresponding to a centroid position of the movable unit.

5. The color measurement apparatus according to claim 1, wherein
    a battery that is a power supply source of the apparatus is disposed in the fixed unit.

6. The color measurement apparatus according to claim 1, wherein
    the incident light processing portion includes
        a variable wavelength optical filter that transmits a predetermined wavelength component of incident light, and
        a light reception portion that receives light transmitted through the optical filter,
    the movable unit includes
        a first circuit substrate including the optical filter, and
        a frame that is disposed at a position facing the optical filter disposed in the first circuit substrate and includes a reduction portion which reduces a quantity of light heading toward the optical filter through the opening portion, and
    a gap between the frame and the optical filter is filled with a plastic member.

7. The color measurement apparatus according to claim 6, wherein
    the optical filter is a Fabry-Perot etalon.

8. The color measurement apparatus according to claim 1, wherein
    the movable unit includes
        a first circuit substrate including the incident light processing portion,
        a second circuit substrate including a light emission portion that emits light for measurement, and
        a third circuit substrate to which a battery that is a power supply source of the apparatus is coupled,
    the fixed unit includes a fourth circuit substrate that is positioned on an upper surface of the apparatus and to which a display portion which performs various types of display is coupled, and
    the second circuit substrate, the first circuit substrate, the third circuit substrate, the battery, and the fourth circuit substrate are arranged in an overlapping manner in order from the opening portion forming member toward the display portion in the first direction.

* * * * *